United States Patent
Young

(10) Patent No.: US 6,742,053 B1
(45) Date of Patent: May 25, 2004

(54) TWO-DIMENSIONAL EXECUTION QUEUE FOR HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 23 days.

(21) Appl. No.: 10/295,618

(22) Filed: Nov. 14, 2002

Related U.S. Application Data

(63) Continuation-in-part of application No. 09/587,538, filed on Jun. 1, 2000.

(51) Int. Cl.$^7$ .................................................. G06F 3/00
(52) U.S. Cl. .......................... 710/5; 710/36; 710/112; 711/128; 712/245
(58) Field of Search ........................... 710/1, 5, 20, 24, 710/39, 53, 100, 36, 22, 31, 38, 112; 711/147, 128, 170; 712/225, 245

(56) References Cited

U.S. PATENT DOCUMENTS

| | | | | |
|---|---|---|---|---|
| 4,149,243 A | * | 4/1979 | Wallis | 364/200 |
| 5,564,023 A | | 10/1996 | Young | 710/100 |
| 5,625,800 A | | 4/1997 | Brayton et al. | 395/500 |
| 5,627,745 A | | 5/1997 | Flood | 700/2 |
| 5,729,681 A | * | 3/1998 | Aditya et al. | 395/200.1 |
| 5,781,199 A | * | 7/1998 | Oniki et al. | 345/505 |
| 5,797,034 A | | 8/1998 | Young | 710/24 |
| 5,938,747 A | | 8/1999 | Young | 710/53 |
| 6,006,292 A | | 12/1999 | Young | 710/39 |
| 6,049,526 A | | 4/2000 | Radhakrishnan et al. | 370/229 |
| 6,609,161 B1 | | 8/2003 | Young | 710/5 |

OTHER PUBLICATIONS

U.S. patent application Ser. No. 10/443,241 entitled "Dequeuing From a Host Adapter Two–Dimensional Queue," of B. Arlen Young, filed on May 21, 2003.

* cited by examiner

Primary Examiner—Jeffrey Gaffin
Assistant Examiner—Rijue Mai
(74) Attorney, Agent, or Firm—Gunnison, McKay & Hodgson, L.L.P.; Forrest Gunnison

(57) ABSTRACT

A two-dimensional hardware control block execution queue includes a plurality of initiator queues where each initiator queue includes at least one hardware control block. Each of the initiator queues is a queue of hardware command blocks, e.g., SCSI control blocks (SCBs) for a specific initiator device on the I/O bus. There is only one initiator queue for each initiator device. One head hardware control block, and only one head hardware control block of each initiator queue, is included in a common queue. Only a common queue head pointer is stored in a memory. An initiator command block tail pointer is stored in the head hardware control block for that initiator queue.

11 Claims, 22 Drawing Sheets

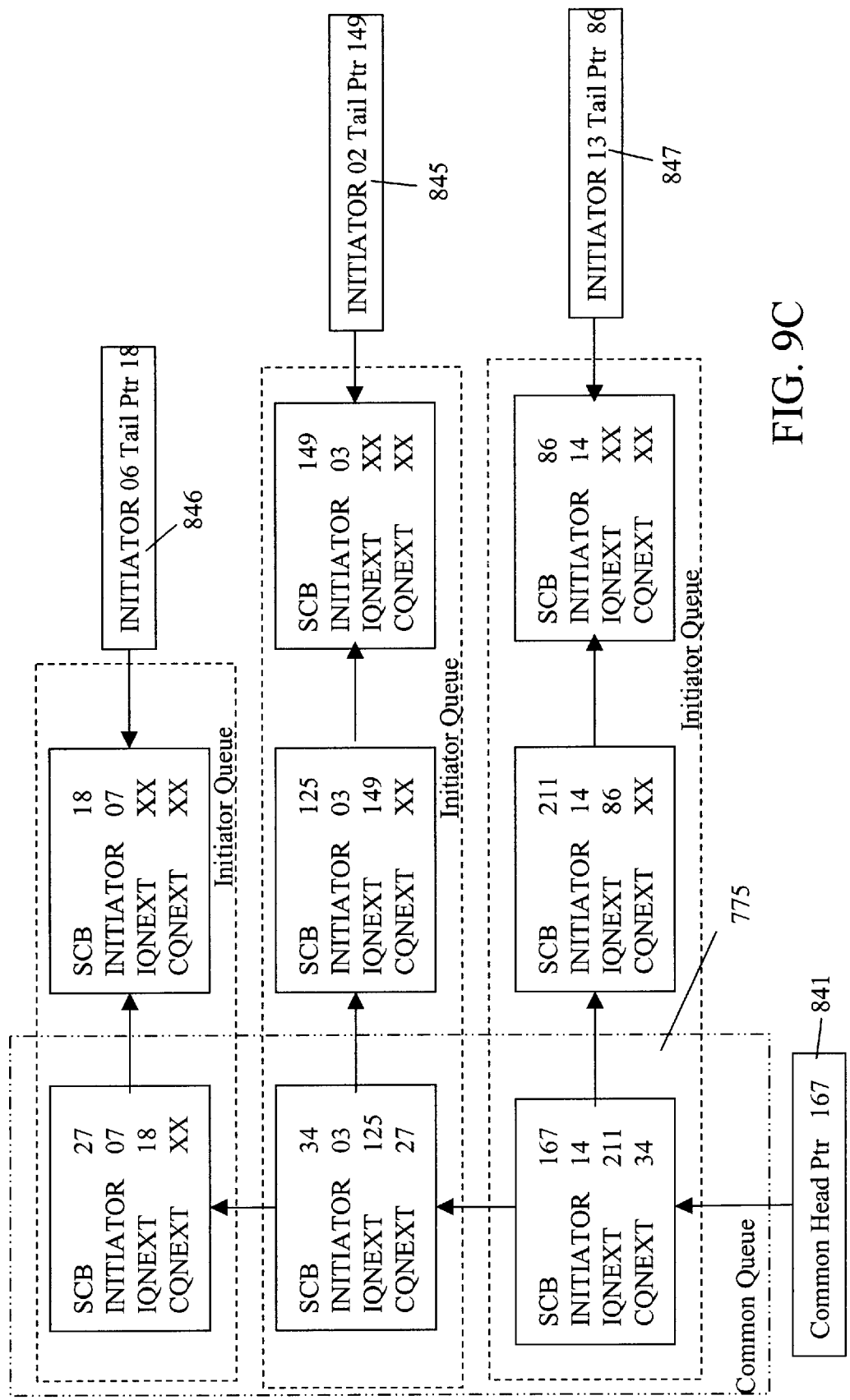

TWO-DIMENSIONAL EXECUTION QUEUE FOR HOST ADAPTERS

RELATED APPLICATION

This application is a continuation-in-part of co-pending and commonly assigned U.S. patent application Ser. No. 09/587,538 entitled "Two-Dimensional Execution Queue for Host Adapters," of B. Arlen Young, filed on Jun. 1, 2000, which is incorporated herein by reference in its entirety.

BACKGROUND OF THE INVENTION

1. Field of the Invention

The present invention relates generally to host adapters that interface two I/O buses, and more particularly, execution queues for host adapters.

2. Description of Related Art

Hardware control blocks, sometimes called sequencer control blocks or SCSI command blocks (SCBs), are typically used for transferring information between a software host adapter device driver in a host computer system 106 and a host adapter integrated circuit 120 that controls operations of one or more peripheral devices. Methods for queuing SCBs are known to those of skill in the art.

For example, see copending and commonly assigned U.S. patent application Ser. No. 07/964,532 entitled "Intelligent SCSI Bus Host Adapter Integrated Circuit," of Craig A. Stuber et al. filed on Oct. 16, 1992, which is incorporated wherein by reference in its entirety. See also, commonly assigned U.S. Pat. No. 5,625,800 entitled "A Sequencer Control Block Array External To A Host Adapter Integrated Circuit" of Michael D. Brayton et al. filed on Jun. 30, 1994; and also U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

A prior art method for queuing SCBs for a system 100, which included a processor 105 in a host system 106 and a host adapter device 120 with a sequencer 125, used a one-dimensional linked list SCB queue 160 within a SCB array 155 in random access memory 150. A device driver executing on microprocessor 105 managed host adapter 120 using SCBs, e.g., hardware control blocks, in SCB queue 160. Each SCB in SCB queue 160 had a next queue site field Q_NEXT, sometimes referred to as field Q_NEXT, which was used to store a SCB site pointer that addressed the next SCB storage site in SCB queue 160.

Queue 160 was delimited by head pointer 141 and tail pointer 142. Head pointer 141 was the number of the site in SCB array 155 storing the SCB to be executed next, and tail pointer 142 was the number of the site in SCB array 155 containing the last SCB transferred from host system 106. Next queue site field Q_NEXT in the site addressed by tail pointer 142 had an invalid value that was used to identify the SCB as the last in queue 160 in addition to tail pointer 142.

When queue 160 was empty, head pointer 141 was an invalid value. When a new SCB was transferred from host system 106 to SCB array 155, head pointer 141 and tail pointer 142 were changed to point to the storage site of the new SCB, i.e., were changed to valid values. Field Q_NEXT in the new SCB was set to an invalid value to indicate that the SCB was the last SCB in queue 160.

As each new SCB was transferred from host system 106 to SCB array 155, tail pointer 142 was used to identify the end of queue 160. Field Q_NEXT in the SCB pointed to by tail pointer 142 was changed to point to the newly transferred SCB, and then tail pointer 142 was changed to point to the storage site of the newly transferred SCB.

A valid head pointer 141 indicated that one or more commands were available for transfer to one or more SCSI targets. The next target selected was specified by information within the SCB addressed by head pointer 141. Host adapter 120 removed the SCB at the head of queue 160 for execution and selected the specified target. Head pointer 141 was changed to point to the next SCB in queue 160, i.e., the value in field Q_NEXT of the SCB removed for execution was copied to head pointer 141. When the selection process was complete, the command contained within the SCB was transferred to the target.

SCBs in array 160 were executed and targets were selected.,in the order that the SCBs were received from host system 106. This order is shown by the dashed line in FIG. 1. SCBs were not inserted or removed from the middle of queue 160.

Other methods are known for queuing SCSI command blocks for a SCSI target. See for example, U.S. Pat. Nos. 5,938,747 and 6,006,292, each of which is incorporated herein by reference. Independent of the method used to manage SCBs in a queue within the SCB array, SCBs are executed and targets are selected in the order that the SCBs were received from host system 106. SCBs are not inserted into or removed from the middle of the queue within the SCB array.

SUMMARY OF THE INVENTION

According to an embodiment of this invention, a command block execution queue stored in a memory includes a plurality of command blocks in a first linked list, sometimes called a common queue of command blocks. In one embodiment, the first linked list is delimited by a stored head pointer and a stored tail pointer. In another embodiment, only the head pointer is stored.

The command block execution queue further includes: another plurality of command blocks in a second linked list. There is a specific relationship between the first and second linked lists. Specifically, one and only one of the another plurality of command blocks is included in the plurality of command blocks in the first linked list. The second linked list is delimited by only a tail pointer.

This command block execution queue is a target command block execution queue if a host adapter is functioning in an initiator mode. Conversely, this command block execution queue is an initiator command block execution queue if the host adapter is functioning in a target mode. The host adapter can have both a target command block execution queue and an initiator command block execution queue if the host adapter functions in both initiator and target modes.

In another embodiment, the command block execution queue includes a common linked list of command blocks having a common head command block and a common tail command block. A head pointer addresses the common head command block, while a tail pointer addresses the common tail command block. The command block execution queue also includes a target linked list of command blocks having a target head command block and a target tail command block wherein only the target head command block is included in the common linked list of command blocks. Only a target tail pointer to the target tail command block delimits the target linked list.

In another embodiment, a command block execution queue stored in a memory includes a plurality of command blocks in a first linked list. The command block execution queue also includes another plurality of command blocks in a second linked list. Only one of the another plurality of command blocks is included in the plurality of command blocks in the first linked list. Also, the only one of the another plurality of command blocks includes a tail pointer to a last command block in the another plurality of command blocks. The tail pointer is an only delimiter for the second linked list.

This embodiment also includes a head pointer to a head command block in the first linked list. The head pointer is an only delimiter for the first linked list stored in the memory.

In still yet another embodiment, a command block execution queue includes a common linked list of command blocks having.,a common head command block and a common tail command block. A head pointer to the common head command block is stored in a memory. An initiator linked list of command blocks has an initiator head command block and an initiator tail command block. Only the initiator head command block is included in the common linked list of command blocks. The initiator head command block includes a tail pointer to the initiator tail command block.

The common linked list contains a maximum of one command block for an initiator. The initiator linked list contains only command blocks for a single initiator device.

A method of managing a command block execution queue where each command block is associated with one of a plurality of initiator devices determines whether an initiator queue exists for an initiator device specified in a hardware command block. The hardware command block is appended to a tail of the initiator queue for the initiator device upon finding that the initiator queue exists. The hardware command block is appended to a tail of a common queue upon finding that the initiator queue does not exist. Appending the hardware command block to the tail of the common queue includes walking the common queue to locate the tail.

In one embodiment, a system includes a two-dimensional initiator execution queue. This queue includes a plurality of initiator command blocks in a first linked list and another plurality of initiator command blocks in a second linked list. Only one of the another plurality of initiator command blocks is included in the plurality of initiator command blocks in the first linked list. Also, the only one of the another plurality of initiator command blocks includes a tail pointer to a last command block in the another plurality of command blocks where the tail pointer is an only delimiter for the second linked list.

This system also includes a memory coupled to the two-dimensional initiator execution queue. The memory includes a stored common queue head pointer for the two-dimensional initiator execution queue.

In one embodiment, the system further includes a two-dimensional target execution queue. This queue includes a plurality of target command blocks in a third linked list, and another plurality of target command blocks in a fourth linked list. Only one of the another plurality of target command blocks is included in the plurality of target command blocks in the third linked list.

BRIEF DESCRIPTION OF THE DRAWINGS

FIG. 9C is an illustration of the two-dimensional initiator hardware command block execution queue of FIG. 9B after sending data for the common queue head hardware command block to an initiator device.

In the following description, elements with the same reference numeral are the same or equivalent elements.

DETAILED DESCRIPTION

Figure 1:
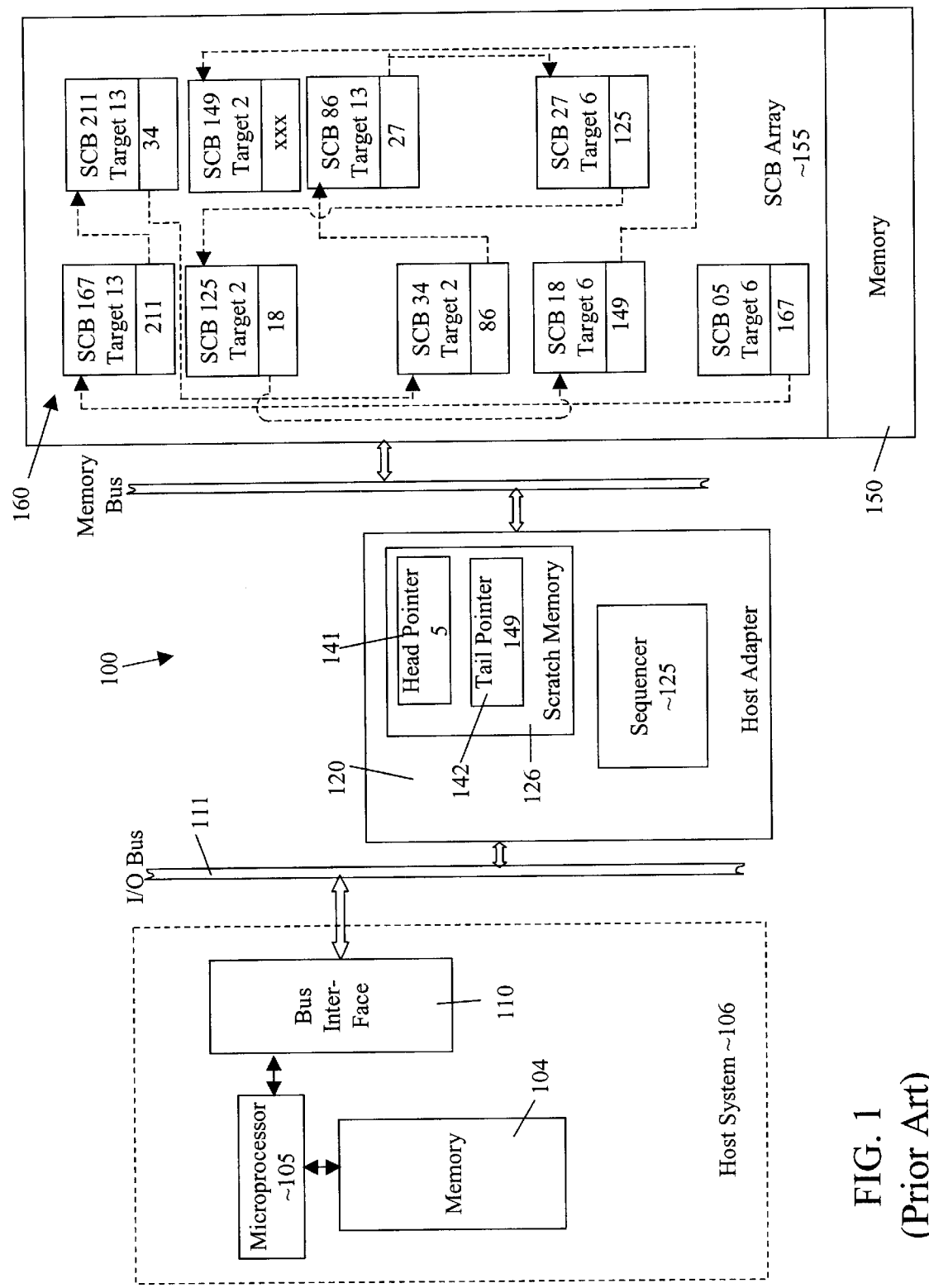
FIG. 1 is a block diagram of a prior art system that includes a linked-list, i.e., one-dimensional, SCB queue.
Figure 2:
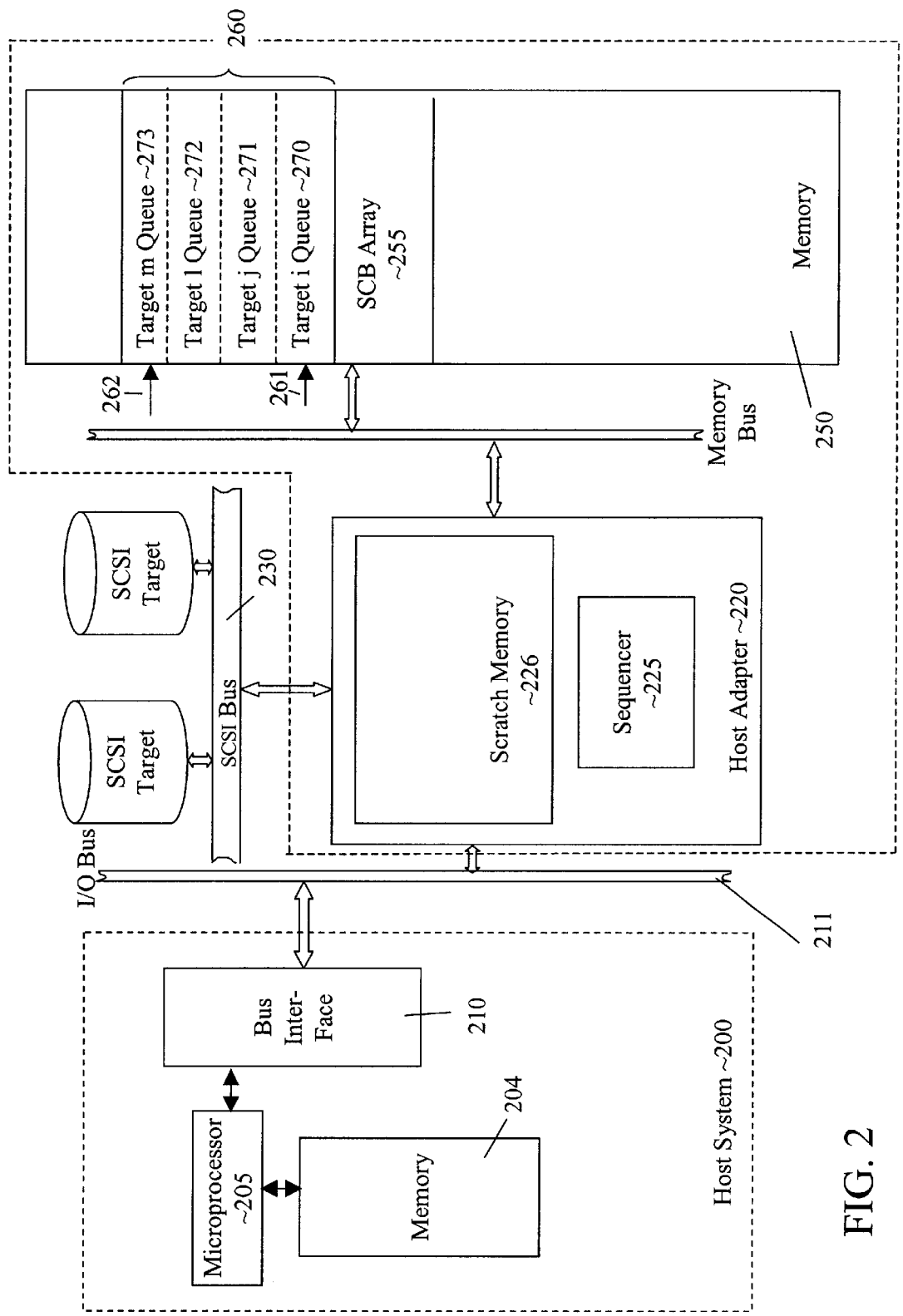
FIG. 2 is a block diagram of a host adapter system that includes the two-dimensional target hardware command block execution queue of this invention.

According to one embodiment of the present invention, a two-dimensional target hardware control block execution queue 260 facilitates multiple hardware control block delivery to a single target device over an I/O bus 230, such as a SCSI bus. As explained more completely below, two-dimensional target hardware control block execution queue 260 includes a plurality of target queues 270 to 273, where each target queue includes at least one hardware control block. Each of target queues 270 to 273 is a queue of hardware command blocks, e.g., SCSI control blocks (SCBs), for a specific target device on I/O bus 230.

When a selection is made by host adapter 220 for a target device based upon a hardware control block addressed by a head pointer 261, all hardware control blocks in target queue 270 within the two-dimensional target hardware control block execution queue 260, which are accepted by the target device, are transferred to the target device. Those of skill in the art will appreciate that when it is stated that a hardware control block or a SCB is transferred to a target device, typically the complete block received from a host is not transferred. Rather, a portion of the hardware control block, sometimes referred to as a command, is transferred to the target device. Accordingly, herein transfer of a SCB or a hardware control block to a target device means transfer of only that portion of the block necessary to inform the target device of the operation or operations that the target device needs to perform.

If there are more hardware control blocks in target queue 270 than are accepted by the target device, target queue 270 is moved to the end of two-dimensional target execution queue 260. Tail pointer 262 is changed to address the first hardware control block in target queue 270, and head pointer 261 is moved to address the first hardware control block in target queue 271.

Hence, unlike the prior art hardware control block queues that transferred a single hardware control block for each target selection, the two-dimensional hardware control block queue of this invention permits transfer of as many available hardware control blocks as can be accepted by the target device. This is particularly advantageous for Fibre Channel/Arbitrated Loop for sending more than one command to a target for a single connection to that target. Similar performance enhancements are obtained for Packetized SCSI.

In one embodiment, two-dimensional target execution queue 260 includes a common queue 275 (See FIG. 3B), e.g., SCB 05, SCB 167 and SCB 34 in SCB array 255 in a memory 250, and a plurality of target queues 270A to 272A. In this embodiment, SCB array 255 includes 256 storage locations, and a reference number of an SCB indicates the storage location within SCB array 255. Moreover, in one embodiment, memory 250 is internal to host adapter 220 and in another embodiment, memory 250 is external to host adapter 220.

A first SCB in common queue 275 of two-dimensional target execution queue 260A, in this embodiment, is addressed by a common queue head pointer 341, which is this example and at this point in time, has a value of 05. Thus, common queue head pointer 341 addresses SCB 05 in SCB array 255. In this embodiment, common queue head pointer 341 is stored in scratch memory 226 of host adapter 220. A last SCB in common queue 275 is addressed by a common queue tail pointer 342, which in this example and at this point in time, has a value of 34. Thus, common queue tail pointer 342 addresses SCB 34 in SCB array 255.

Common queue 275 has one and only one SCB per target. Common queue 275 is a linked list of SCBs, i.e., a linked list in a first direction. In this embodiment, each SCB includes a next common queue site field CQNEXT, sometimes referred to herein as field CQNEXT, that contains a pointer to the next SCB in the common queue. Field CQNEXT in the last SCB in the common queue has an invalid pointer. This facilitates automated hardware in host adapter 220 determining when the end of common queue 275 is reached without having to access common queue tail pointer 342.

Figure 3A:
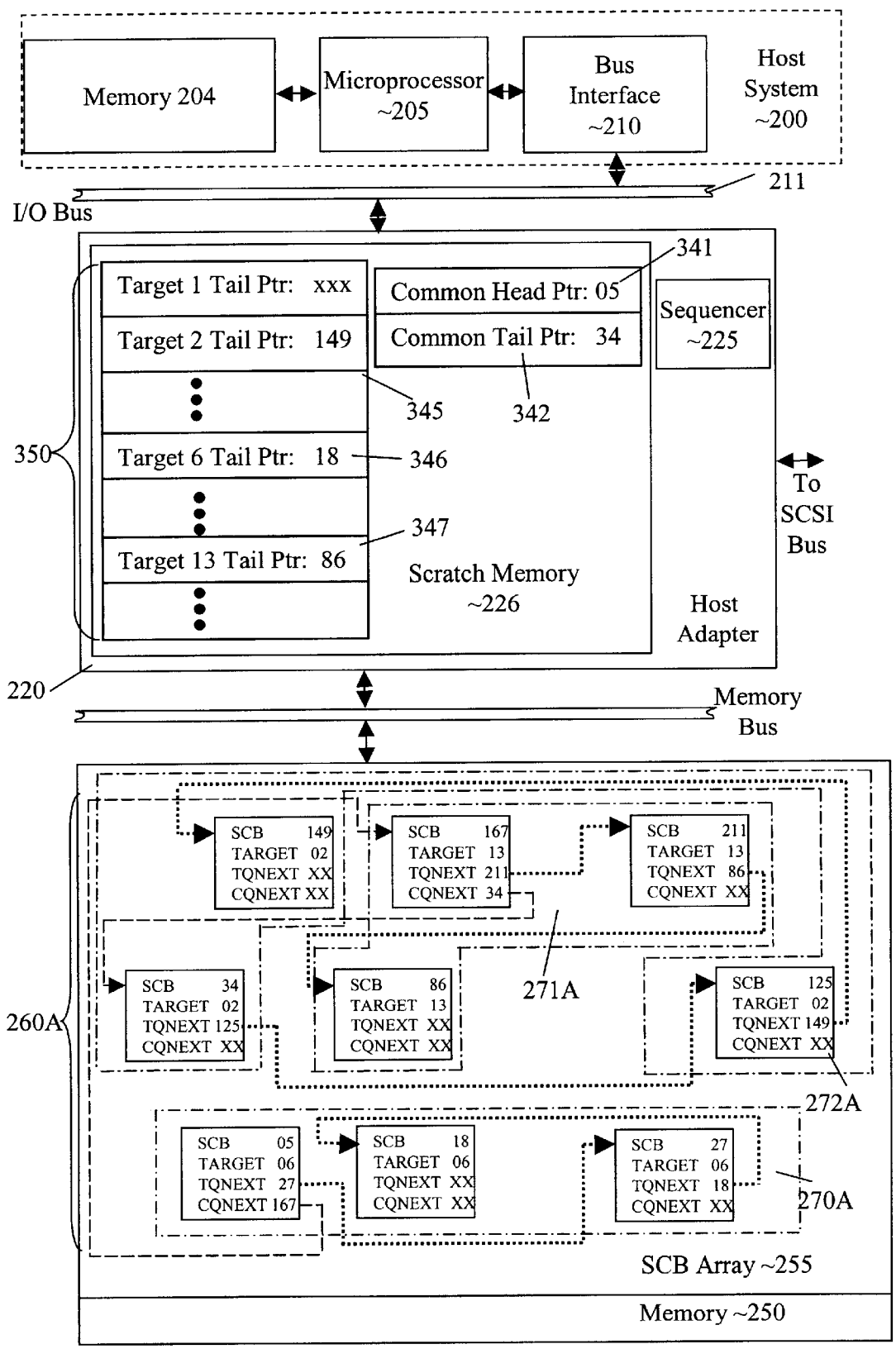
FIG. 3A is a block diagram of a host adapter system that includes one embodiment of the two-dimensional target hardware-command block execution queue of this invention.

Each target queue is a linked list of SCBs for one specific target, i.e., a linked list in a second direction. In the example of FIG. 3A, target queue 270A is for target 06; target queue 271A is for target 13; and target queue 272A is for target 2.

Each of target queues 270A to 272A is a linked list that has its own target tail pointer, i.e., target tail pointer 345 for target queue 272A, target tail pointer 346 for target queue 270A, and target tail pointer 347 for target queue 271A. Hence, each target queue is delimited only by a target tail pointer.

In memory 226, tail pointers 345 to 347 are stored in contiguous list 350 in target number order, which in this embodiment is increasing target number order. Initially, each entry in list 350 is set to an invalid value. The value of a particular target tail pointer is assigned, as described more completely below.

In this embodiment, each SCB also includes a next target queue site field TQNEXT, sometimes referred to herein as field TQNEXT, which contains a pointer to the next SCB in the target queue. Field TQNEXT in the last SCB in the target queue has an invalid pointer. Again, this facilitates automated hardware in host adapter 220 determining when the end of the target queue is reached without having to access the target tail pointer. Notice that next common queue site field CQNEXT is not used except for SCBs in common queue 275.

A SCB is built in memory 204 by a device driver executing on processor 205, in a manner similar to that in the prior art. In particular, the device driver specifies the SCB storage location for the SCB in SCB array 255, and sets field CQNEXT and field TQNEXT to invalid values in one embodiment. Alternatively, these fields can be set by firmware executing on sequencer 225. The SCB is transferred from memory 204 to the specified storage location in SCB array 255. The particular process used to transfer the SCB from memory 204 to SCB array 255 is not essential to this invention.

Figure 4:
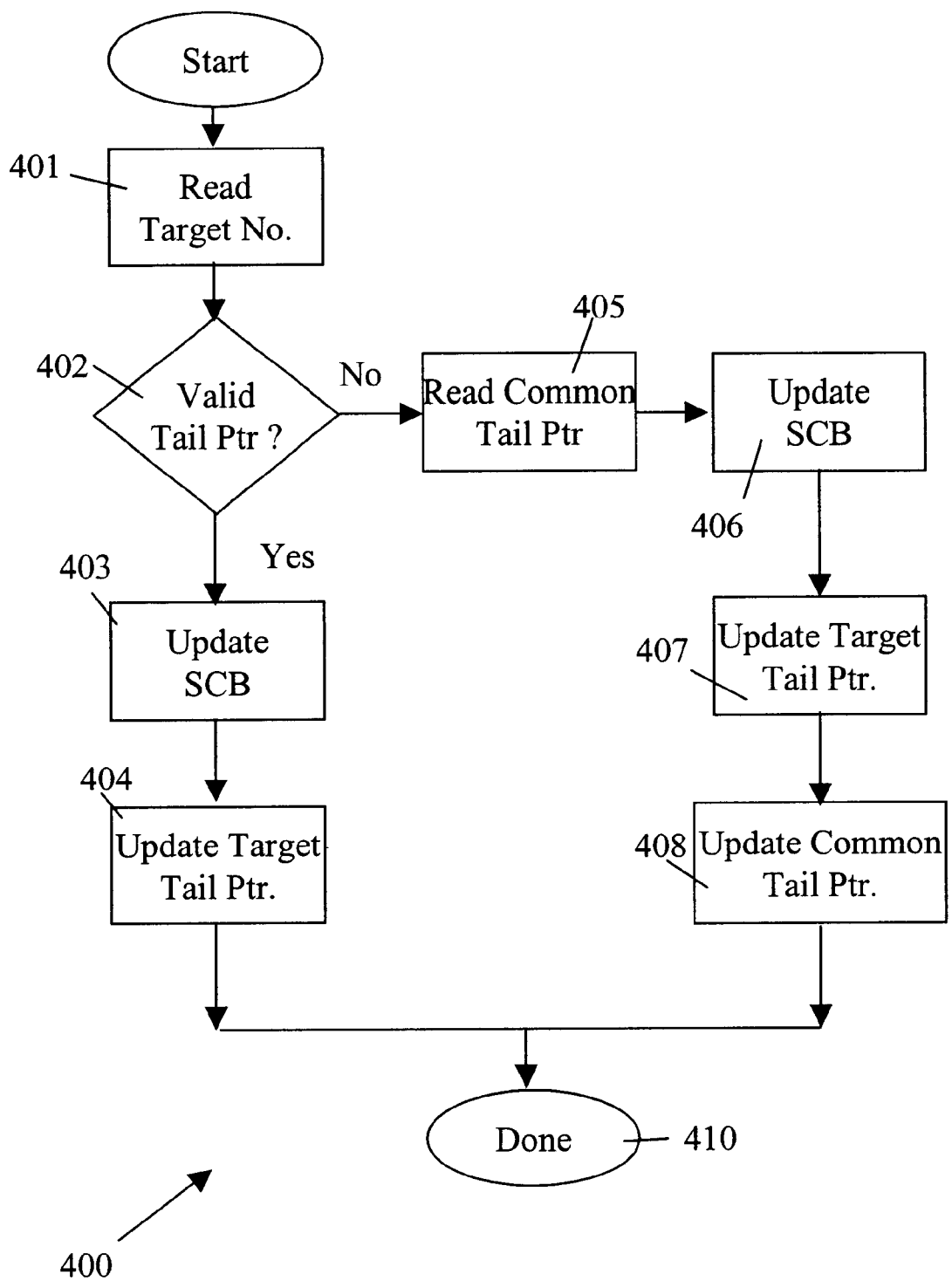
FIG. 4 is a process flow diagram of one embodiment of a method for appending hardware command blocks to the two-dimensional target hardware command block queue of FIGS. 3A and 3B.

When there is a new SCB in SCB array 255, firmware implementing append operation 400 (FIG. 4) and executing on sequencer 225 reads the target number from the SCB in read target number operation 401, and processing transfers to valid tail pointer check operation 402. In operation 402, the target number is used as index into list 350 of target queue tail pointers. If the target queue tail pointer at the indexed location in list 350 has an invalid value, processing transfers to read common queue tail pointer operation 405 and otherwise to update SCB operation 403.

If a valid target tail pointer exists for a target device, there is a target queue for that target in SCB array 255.

Consequently, update SCB operation 403 accesses the SCB addressed by the target tail pointer read in operation 401. Update SCB operation 403 writes the location of the new SCB within SCB array 255 in field TQNEXT of the SCB addressed by the target tail pointer. Update SCB operation 403 transfers processing to update target tail pointer operation 404.

In update target tail pointer operation 404, the target tail pointer in list 350 that is indexed by the target number in the new SCB is changed to point at the storage location in SCB array 255 of the new SCB. Operation 404 transfers to done operation 410, because the new SCB has been appended to the appropriate target queue and consequently two-dimensional target execution queue 260A.

If a valid tail pointer does not exist for a target device in list 350, there is not an SCB for the target device in common queue 275. Consequently, read common queue tail pointer operation 405 reads the common queue tail pointer in memory 204 to determine the storage location of the last SCB in common queue 275. Read common queue tail pointer operation 405 transfers processing to update SCB operation 406.

Update SCB operation 406 accesses the SCB addressed by common queue tail pointer. Update SCB operation 406 writes the location of the new SCB within SCB array 255 in field CQNEXT of the SCB addressed by common queue tail pointer. Update SCB operation 406 transfers processing to update target tail pointer operation 407.

In update target tail pointer operation 407, the target tail pointer in list 350 indexed by the target number is changed to point at the location in SCB array 255 of the new SCB. Operation 407 transfers update common queue tail pointer operation 408.

Figure 3B:
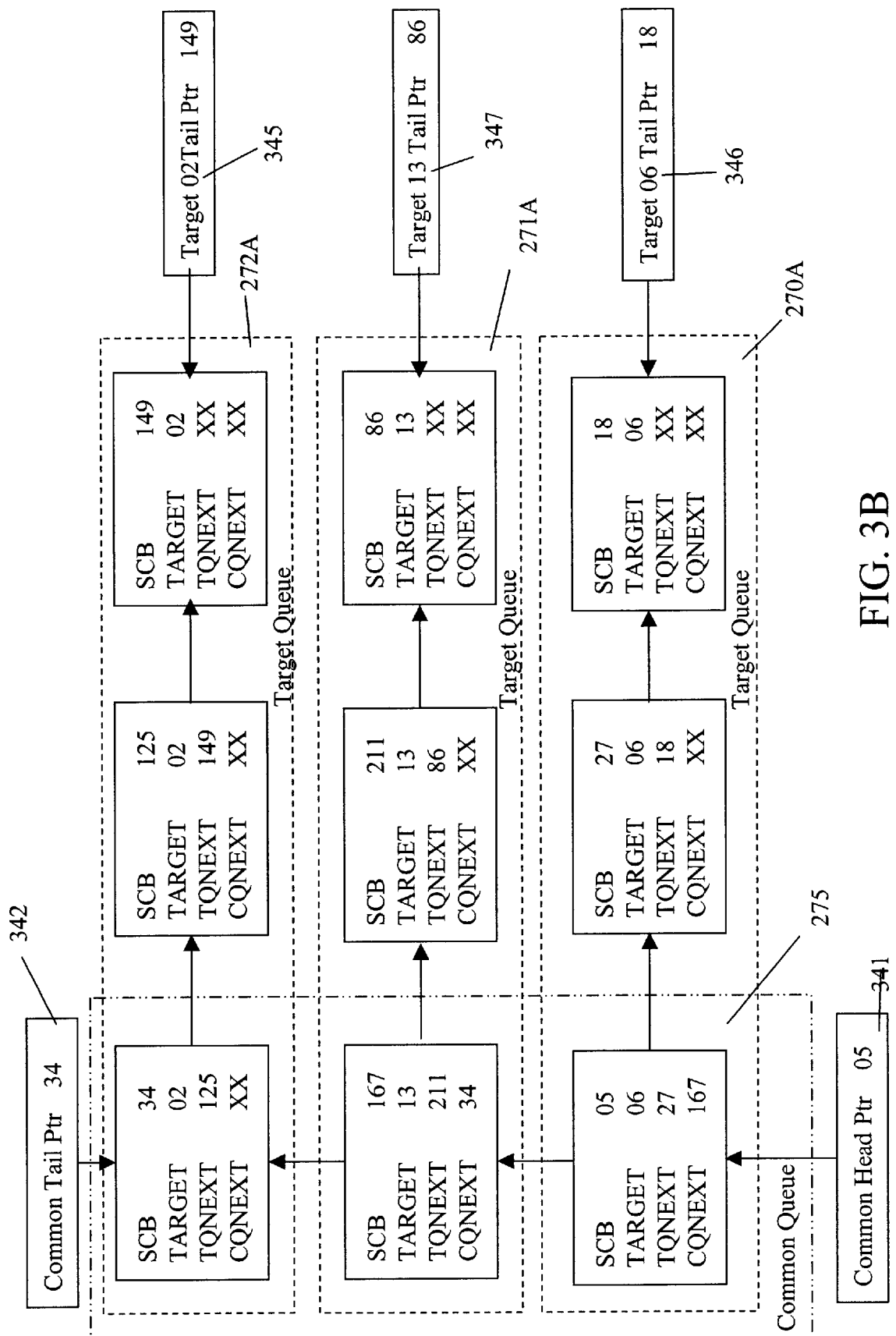
FIG. 3B is an illustration of only the two-dimensional target hardware command block execution queue of FIG. 3A.

In update common queue tail pointer operation 408, common queue tail pointer 342 is changed to point at the location in SCB array 255 of the new SCB. Operation 408 transfers to done operation 410, because the new SCB has been appended to end of common queue 275, and a new target queue has been defined in two-dimensional target execution queue 260A. Using method 400, SCBs are appended to the common and target queues in the order of arrival from host system 200. FIG. 3B is an alternative presentation of two-dimensional target execution queue 260A that shows more clearly the two-dimensional nature of the queue built using method 400.

Figure 5:
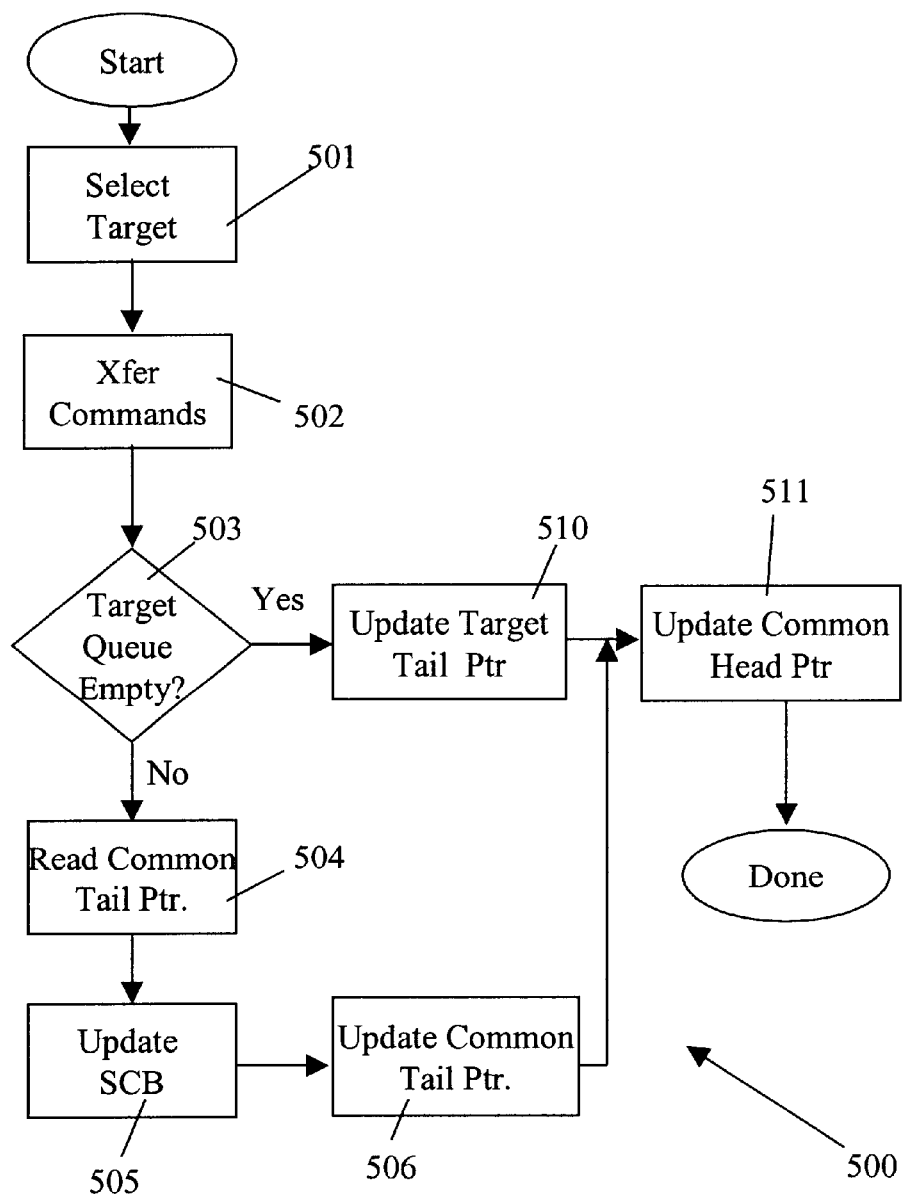
FIG. 5 is a process flow diagram of one embodiment of a method for managing removal of hardware command blocks from the two-dimensional target hardware command block queue of FIGS. 3A and 3B.

To transfer a SCB from two-dimensional target execution queue 260A to a target device, method 500 (FIG. 5) is used. In select target operation 501, host adapter 220 reads common queue head pointer 341, and then determines the target specified in the SCB at the head of two-dimensional target execution queue 260A, i.e., the SCB addressed by common queue head pointer 341. In the example of FIGS. 3A and 3B, common queue head pointer 341 addresses SCB 05, which specifies target 06. Consequently, host adapter 220 selects target 06 and transfers processing to transfer commands operation 502.

In transfer commands operation 502, host adapter 220 attempts to transfer the command blocks contained in all the SCBs in the target queue for the selected target. The particular procedure for transferring command blocks to a target is dependent on the protocol used, and the procedure is known to those of skill in the art.

For example, according to the Packetized SCSI protocol, all command information units sent to a target, except for the last, are preceded by a SPI L_Q packet with a Type field of Multiple Commands. The value in the Type field indicates to the target that another command is available for transfer. The last command information unit sent to the target is preceded by a SPI L_Q packet with a Type field of Command, which signals the target that the command information unit is the last to be transferred.

It is possible that the command blocks within all the SCBs in the target queue cannot be transferred to the target device following selection of the target device. For example, the target's command queue may be full while host adapter 220 has more SCBs in the target queue to transfer. The target device can signal host adapter 220 that the target device cannot accept further command blocks, for example, by changing the SCSI bus phase from phase Data Out to any other phase. Such a SCSI bus phase change prevents host adapter 220 from sending further command blocks in SCBs to the target device. Upon completion of the transfer, transfer commands operation 502 transfers to target queue empty check operation 503.

In target queue empty check operation 503, host adapter 220 determines whether all command blocks in the SCBs in the target queue were transferred to the selected target device, i.e., whether all the SCBs in the target queue were transferred. In the embodiment of FIGS. 3A and 3B, field TQNEXT is read in the last SCB transferred. If field TQNEXT in the last SCB transferred contains a valid pointer, SCBs remain in the target queue to be transferred and the target queue in two-dimensional target execution queue 260A is not empty. Conversely, if field TQNEXT contains an invalid pointer, all SCBs in the target queue were transferred, and the target queue in two-dimensional target execution queue 260A is empty.

The particular way used to determine whether the target queue is empty, e.g., whether all SCBs in the target queue were transferred to the target, is not essential to this invention. Multiple ways to make this determination are possible. For example, a count of the SCBs transferred and a count of the SCBs in the target queue could be compared. Alternatively, a last SCB transferred pointer could be compared with the target tail pointer for the target queue. The important aspect is to determine whether upon completion of the transfer, SCBs remain in the target queue.

If the target queue is not empty, processing transfers from target queue empty check operation 503 to read pointer operation 504. In read pointer operation 504, host adapter 220 reads common queue tail pointer 342. With respect to method 500 and in general, reference to host adapter 220 taking an action refers to the action that results from firmware executing on sequencer 225. In the example of FIGS. 3A and 3B, common queue tail pointer 342 addresses SCB 34 that is at the end of common queue 275. Operation 504 transfers to update SCB operation 505.

Figure 3C:
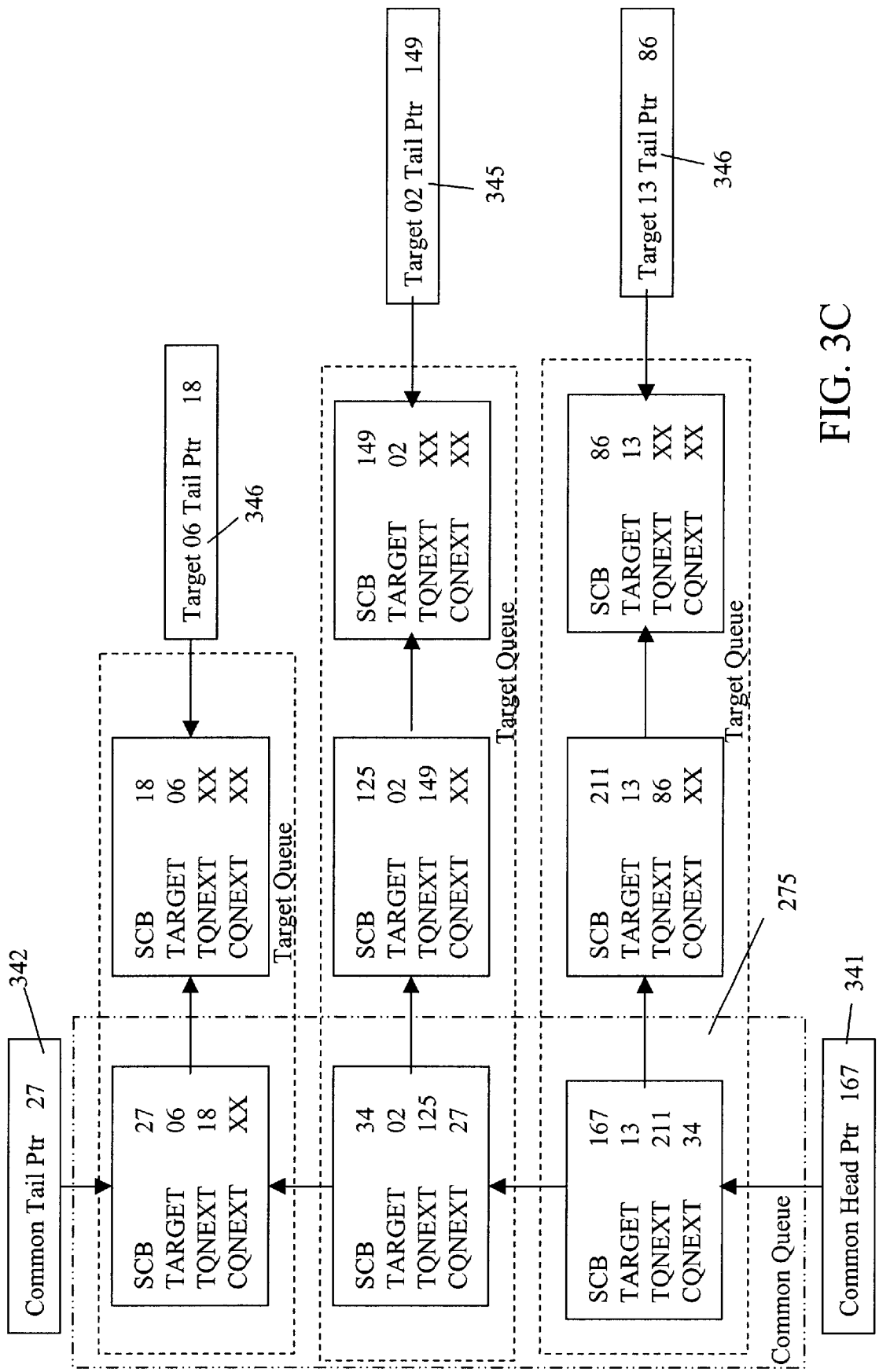
FIG. 3C is an illustration of the two-dimensional target hardware command block execution queue of FIG. 3B after sending the common queue head hardware command block to a target device.

In update SCB operation 505, field CQNEXT in the SCB addressed by common queue tail pointer 342 is set to the value of the location in SCB array 255 of the first SCB remaining in the target queue. As an example, assume that only SCB 05 in target queue 270A was successfully transferred to target 06. In this case, the first SCB remaining in target queue 270A is SCB 27. (See FIG. 3C.) Thus, update SCB operation writes 27 to field CQNEXT in SCB 34 that is addressed by common queue tail pointer 342. Update SCB operation 505 transfers processing to update common queue tail pointer operation 506.

In update common queue tail pointer operation 506, common queue tail pointer 342 is changed to address SCB 27. Hence, the SCBs remaining in target queue 270A are appended to the end of common queue 275, and the SCBs for which commands were successfully transmitted to the target are removed from target queue 270A. Appending the remaining SCBs to the end of common queue 275 assures that all other targets are given an opportunity to receive commands before the first target is selected again for command transfer. Update common queue tail pointer operation 506 transfers processing to update common queue head pointer operation 511.

In update common queue head pointer operation 511, common queue head pointer 341 is changed to address the next SCB in common queue 275. In FIG. 3B, operation 511 reads field CQNEXT in SCB 05 and writes that value to common queue head pointer 341 so that common queue head pointer 341 addresses SCB 167 for target 13 (See FIG. 3C.).

The above discussion assumed that upon completion of transfer commands operation 502, the target queue for the selected target was not empty and so check operation 503 transferred to operation 504. However, if the target queue is empty, check operation 503 transfers processing to update target tail pointer operation 510.

In update target tail pointer operation 510, the target tail pointer for the selected target in list 350 is set to an invalid value to indicate that there is no target queue for that target in two-dimensional target execution queue 260A. Again, for FIGS. 3A and 3B, target 06 tail pointer 346 is set to an invalid value in list 350 in operation 510. This operation effectively removes the SCBs for target 06 from two-dimensional target execution queue 260A. Operation 510 also transfers to operation 511 that was described above and that description is incorporated herein by reference.

Hence, management of two-dimensional target execution queue 260A after command delivery for SCBs in a target queue is quite simple. If all commands specified in the target queue are transferred to the target, the target tail pointer is loaded with an invalid value. Conversely, when not all the commands are transferred to the target, the first remaining SCB in the target queue is appended to the tail of common queue 275. The linking of the remainder of the target queue and the target tail pointer for that queue remain unchanged. In either case, the common queue head pointer is advanced to the next SCB in common queue 275.

With the two-dimensional execution queue of this invention, queue manipulation is simple. SCBs are appended only to the tails of queues, and removed only from heads of queues. All commands for a target are highly available for maximum speed streaming to a target. No searching is required. In particular, wasteful searching across empty queues is not required. Priority of SCB execution is maintained according to the order of delivery by host system 200, although commands for the same target are grouped together. SCBs for which a target cannot accept commands are given lowest priority by appending the SCBs to the end of the two-dimensional execution queue. Only tail pointers are required for the second dimension of queuing.

Figure 6:
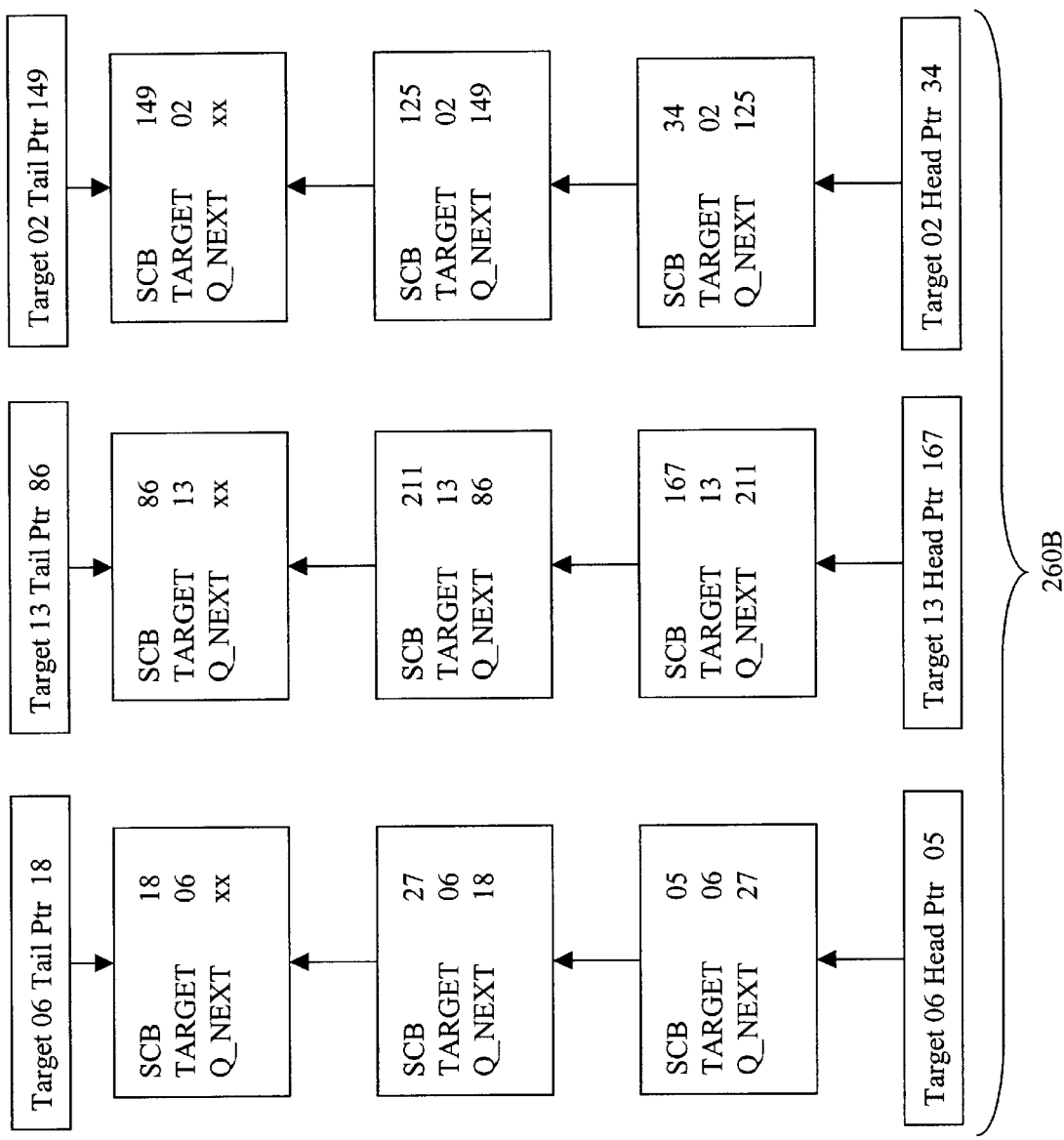
FIG. 6 is an illustration of another embodiment of the two-dimensional target hardware command block execution queue of this invention.

Other alternative embodiments of the two-dimensional execution queue of this invention are possible. For example, FIG. 6 illustrates another embodiment of two-dimensional target execution queue 260B that utilizes the prior art SCBs as described above with a field Q_NEXT. In this example, each target device has a target queue that is delimited by a head pointer and a tail pointer. The target queue is a linked list of SCBs in array 255 for that target device. Space for the pointers for each target queue is allocated even if the target queue is empty.

To select a particular target queue, host adapter firmware must locate the target queues with SCBs ready for execution. In one embodiment, the firmware scans all the target queues using a round-robin or priority starting point, and selects the target corresponding to the first non-empty target queue found. All SCBs for that target are readily located and easily removed from the target queue, because the SCBs are removed from a head of a queue and not somewhere in the middle of a queue. Typically, a host adapter selects targets in the same order as the arrival of SCBs for the targets from the host. This embodiment of the two-dimensional execution queue selects targets in the order of the queue polling scheme.

If the target order from the host is of importance and it is desirable to use two-dimensional target execution queue 260B, an additional first-in-first-out queue of target numbers where the target numbers are placed in this queue in order of receipt from the host could be utilized. If the queue for a particular target is not empty, the target number is not added to the first in first out queue of target numbers. The target number at the output of the target number queue is used as an index into the target queue head pointer list and to select a target. If not all the SCBs for the selected target were transferred, the target number is placed at the input of the queue of target numbers. This eliminates the need to poll, or use the round robin scanning, but requires additional storage and firmware to manage the additional queue of target numbers. In this embodiment, new SCBs are appended to a queue using a method similar to method 400 described above.

The above embodiment is applicable to host adapters operating in the SCSI Initiator Mode. The two-dimensional execution queue allows all the SCBs for a particular SCSI target to be very quickly accessed by automated hardware as that hardware streams command blocks from the SCBS in the queue to the SCSI target. Also, in this embodiment of the two-dimensional execution queue, the site in the queue where a new SCB is to be loaded can be quickly determined.

Figure 7:
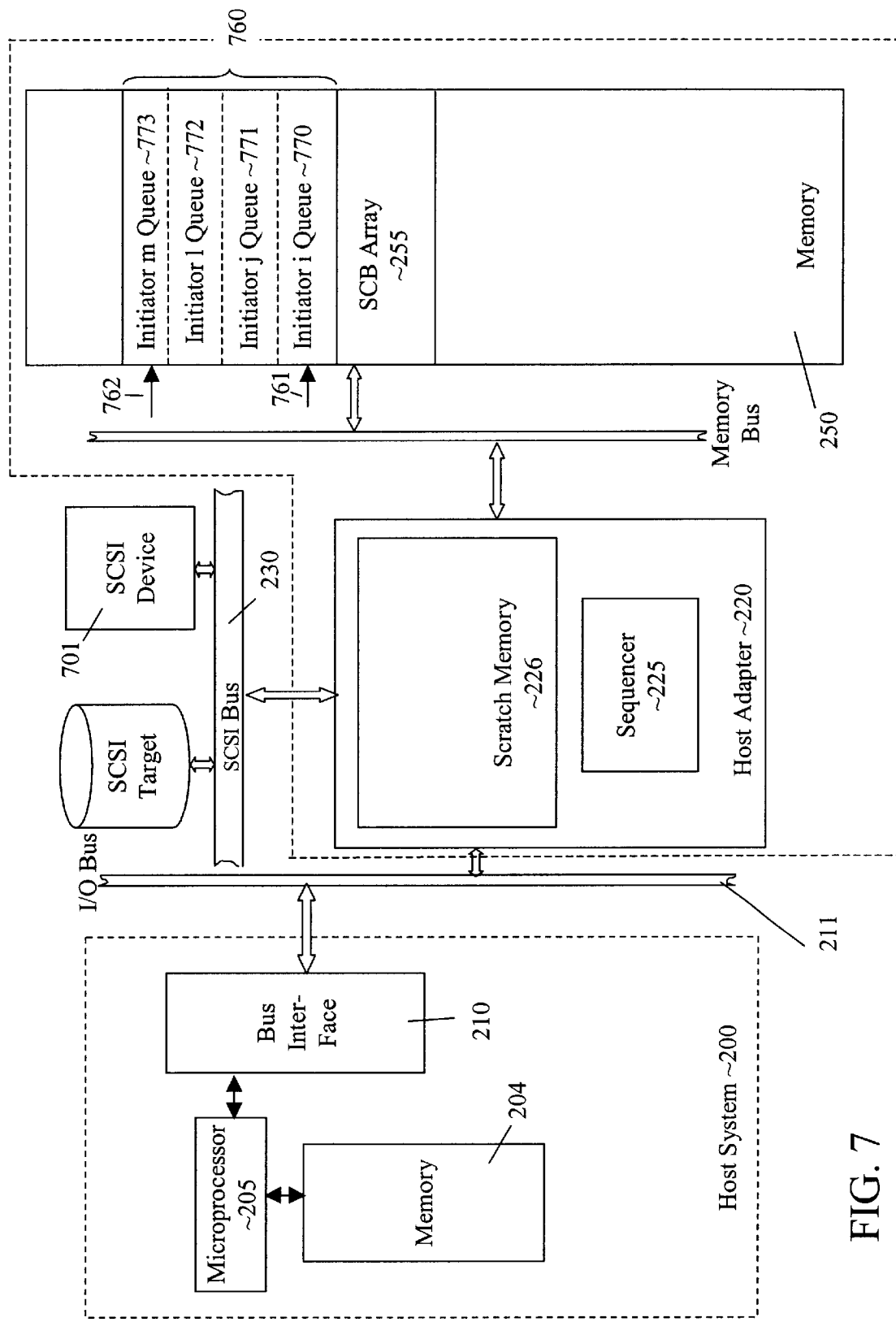
FIG. 7 is a block diagram of a host adapter system that includes one embodiment of the two-dimensional initiator hardware command block execution queue of this invention.

However, some host adapter applications require concurrent execution of SCSI initiator and target modes, or execution in the target mode. To enhance the performance of a host adapter in the SCSI target mode, the above two-dimensional execution queue can be used. For example, as illustrated in FIG. 7, a SCSI device 701 on I/O bus 230, which in this example is a SCSI bus, sends a command to host adapter 220, i.e., host adapter 220 is a target device.

As a target device, host adapter 220 maintains a two-dimensional initiator hardware control block execution queue 760, sometimes called two-dimensional initiator execution queue 760, which facilitates data transfer for commands with a single initiator device over an I/O bus 230, such as a SCSI bus. As explained more completely below, two-dimensional initiator hardware control block execution queue 760 includes a plurality of initiator queues 770 to 773, where each initiator queue includes at least one hardware control block. Each of initiator queues 770 to 773 is a queue of hardware command blocks, e.g., SCSI control blocks (SCBs), for a specific initiator device on I/O bus 230.

When a reselection is made by host adapter 220 for an initiator device based upon a hardware control block addressed by a common queue head pointer 761, data for all hardware control blocks in initiator queue 770 within the two-dimensional initiator hardware control block execution queue 760, which are accepted by the initiator device, are transferred to or from the initiator device. Those of skill in the art will appreciate that when it is stated that data for a hardware control block or a SCB is transferred to or from an initiator device, typically only the data is transferred, and not the hardware control block or the SCB.

If there are hardware control blocks in initiator queue 770 for which the initiator did not accept transfer of the data, initiator queue 770 is moved to the end of two-dimensional initiator execution queue 760. Common queue tail pointer 762 is changed to address the first hardware control block remaining in initiator queue 770, and common queue head pointer 761 is moved to address the first hardware control block in initiator queue 771. This embodiment of two-dimensional initiator execution queue 760 is illustrative only and is not intended to limit the invention to this specific embodiment.

In one embodiment, two-dimensional initiator execution queue 760 includes a common queue 775 (See FIG. 8B), e.g., SCB 05, SCB 167 and SCB 34 in SCB array 255 in a memory 250, and a plurality of initiator queues 770A to 772A. In this embodiment, SCB array 255 includes 256 storage locations, and a reference number of an SCB indicates the storage location within SCB array 255. Moreover, as described above, in one; embodiment, memory 250 is internal to host adapter 220 and in another embodiment, memory 250 is external to host adapter 220.

A first SCB in common queue 775 of two-dimensional initiator execution queue 760A, in this embodiment, is addressed by a common queue head pointer 841, which is this example and at this point in time, has a value of 05. Thus, common queue head pointer 841 addresses SCB 05 in SCB array 255. In this embodiment, common queue head pointer 841 is stored in scratch memory 226 of host adapter 220. A last SCB in common queue 775 is addressed by a common queue tail pointer 842, which in this example and at this point in time, has a value of 34. Thus, common queue tail pointer 842 addresses SCB 34 in SCB array 255.

Common queue 775 has one and only one SCB per initiator. Common queue 775 is a linked list of SCBs, i.e., a linked list in a first direction. In this embodiment, each SCB includes a next common queue site field CQNEXT, sometimes referred to herein as field CQNEXT, which contains a pointer to the next SCB in the common queue. Field CQNEXT in the last SCB in the common queue has an invalid pointer in this embodiment. This facilitates automated hardware in host adapter 220 determining when the end of common queue 775 is reached without having to access common queue tail pointer 842.

Figure 8A:
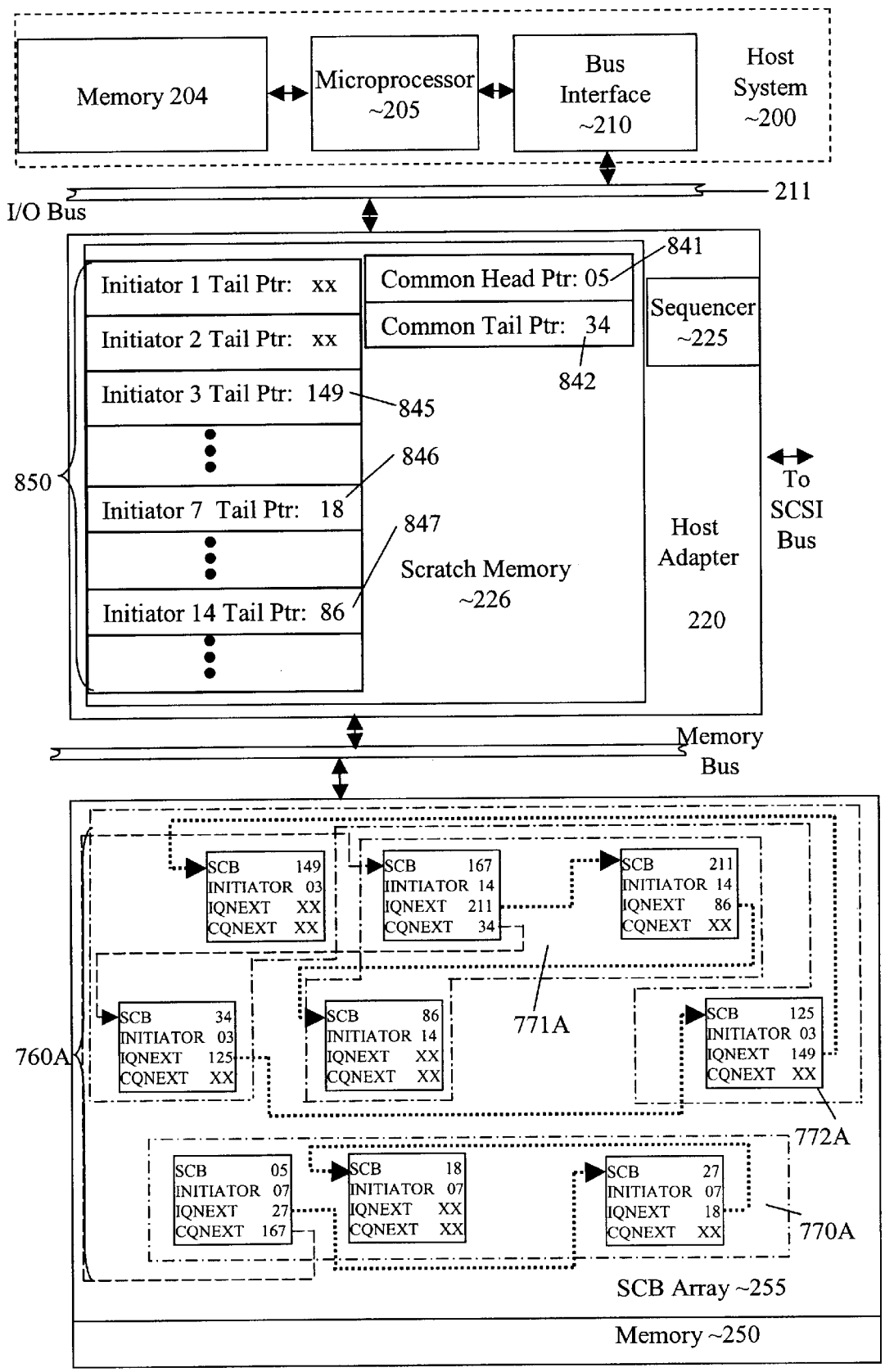
FIG. 8A is a block diagram of a host adapter system that includes one embodiment of the two-dimensional hardware initiator command block execution queue of this invention.

Each initiator queue is a linked list of SCBs for one specific initiator, i.e., a linked list in a second direction. In the example of FIG. 8A, initiator queue 770A is for initiator 07; initiator queue 771A is for initiator 14; and initiator queue 772A is for initiator 03.

Each of initiator queues 770A to 772A is a linked list that, in this embodiment, has its own initiator tail pointer, i.e., initiator tail pointer 845 for initiator queue 772A, initiator tail pointer 846 for initiator queue 770A, and initiator tail pointer 847 for initiator queue 771A. Hence, each initiator queue is delimited only by an initiator tail pointer.

In memory 226, tail pointers 845 to 847 are stored in contiguous list 850 in initiator number order, which in this embodiment is increasing initiator number order. Initially, each entry in list 850 is set to an invalid value. The value of a particular initiator tail pointer is assigned, as described more completely below.

In this embodiment, each SCB also includes a next initiator queue site field IQNEXT, sometimes referred to herein as field IQNEXT that contains a pointer to the next SCB in the initiator queue. Field IQNEXT in the last SCB in the initiator queue has an invalid pointer. Again, this facilitates automated hardware in host adapter 220 determining when the end of the initiator queue is reached without having to access the initiator tail pointer. Notice that next common queue site field CQNEXT is not used except for SCBs in common queue 775.

In one embodiment, when host adapter 220 receives a command from initiator device 701 and places the command in an empty SCB or in a buffer addressed by a field in the empty SCB. The empty SCB is stored in SCB array 255. Host adapter 220 places a pointer to the SCB in a host done queue and notifies a host adapter manager executing on host system 200 that an SCB has been placed in the host done queue.

When the host adapter manager accesses the SCB to determine the command that was completed, the host adapter manager finds that the SCB is an empty SCB except for the command inserted by host adapter 220. The host adapter manager analyzes the command and builds a new SCB for the command.

To this point, the handling of the command by host adapter 220 and the host adapter manager is the same as in the prior art. However, to use two-dimensional initiator execution queue 760 when host adapter 220 is in a target mode, the new SCB includes at least two additional fields, as described above, field CQNEXT and field IQNEXT.

The host adapter manager specifies the SCB storage location for the new SCB in SCB array 255, and the host adapter manager sets field CQNEXT and field IQNEXT to invalid values in one embodiment. Alternatively, these fields can be set by firmware executing on sequencer 225. The SCB is transferred from memory 204 to the specified storage location in SCB array 255. The particular process used to transfer the SCB from memory 204 to SCB array 255 is not essential to this invention, as indicated above.

Figure 8B:
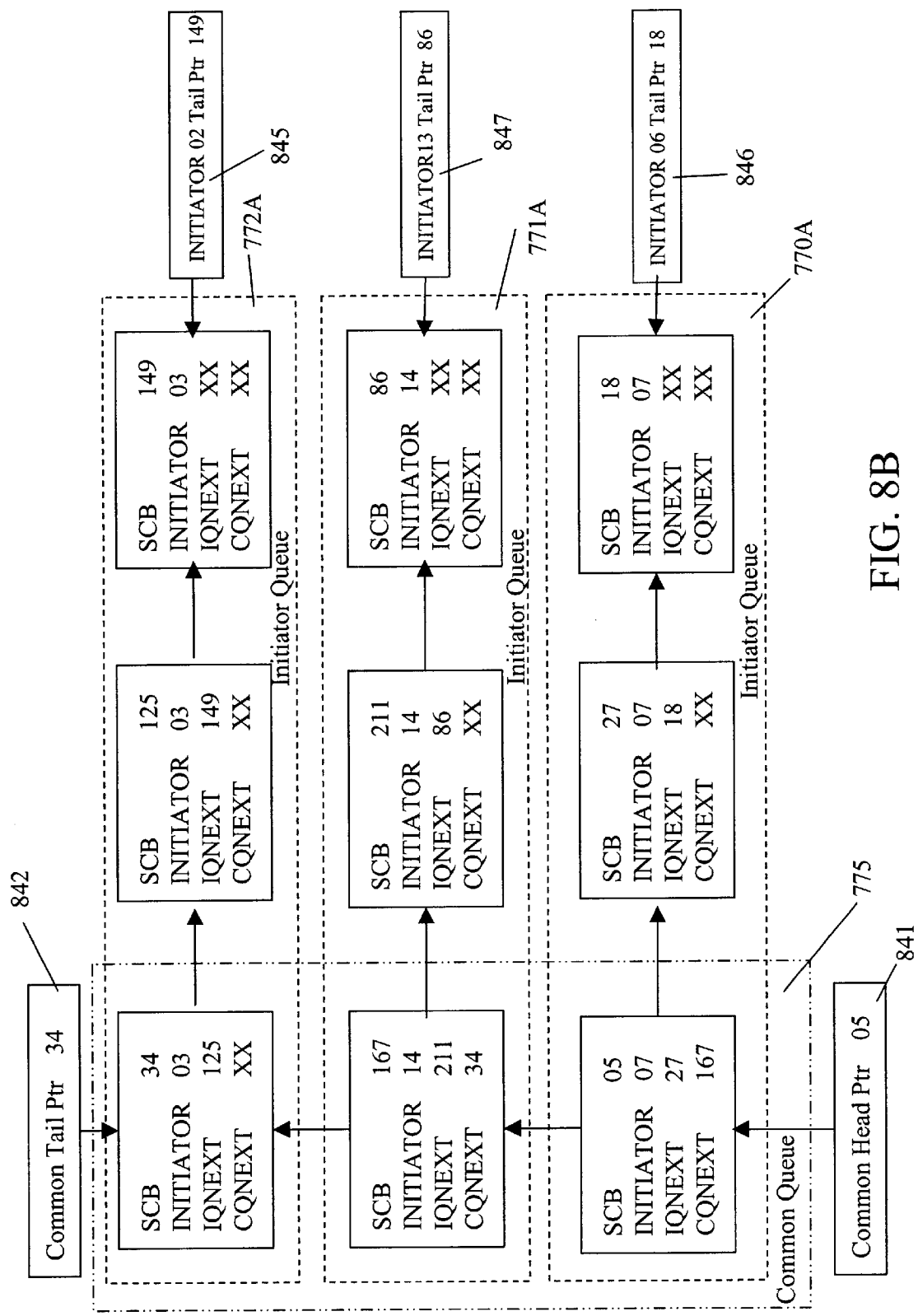
FIG. 8B is an illustration of only the two-dimensional initiator hardware command block execution queue of FIG. 8A.

The construction and operation of two-dimensional initiator execution queue 760A (FIGS. 8A and 8B) is equivalent to two-dimensional target execution queue 260A that was described above, with field IQNEXT substituted for TQNEXT and with the difference in operations in target mode and:,in initiator mode considered. Hence, the above description is incorporated herein by reference. FIG. 8B is another illustration of two-dimensional initiator execution queue 760A.

While queue 760A has advantages equivalent to queue 260A, in some host adapters, scratch memory 226 is limited in size. Consequently, alternative embodiments of two-dimensional initiator execution queue 760 are considered that require less space in scratch memory 226.

It is noted that for initiator mode, initiator mode common queue 275 contains typically as many as 15 SCBs. For target mode, target mode common queue 775 contains typically one or two SCBs with a maximum of probably four SCBs. Thus, target mode common queue 775 is short compared to initiator common queue 275. Note that the queue sizes in the Figures are illustrative only and are not intended to illustrate the number of SCBs typically found in either queue. The fact the common queues are the same size in the Figures is not intended to indicate that the common queues are typically about the same size.

The time required to walk target mode common queue 775 to find the tail SCB of target mode common queue 775 is acceptable. Consequently, common queue tail pointer 842 can be eliminated, as illustrated in FIG. 9A.

Figure 9A:
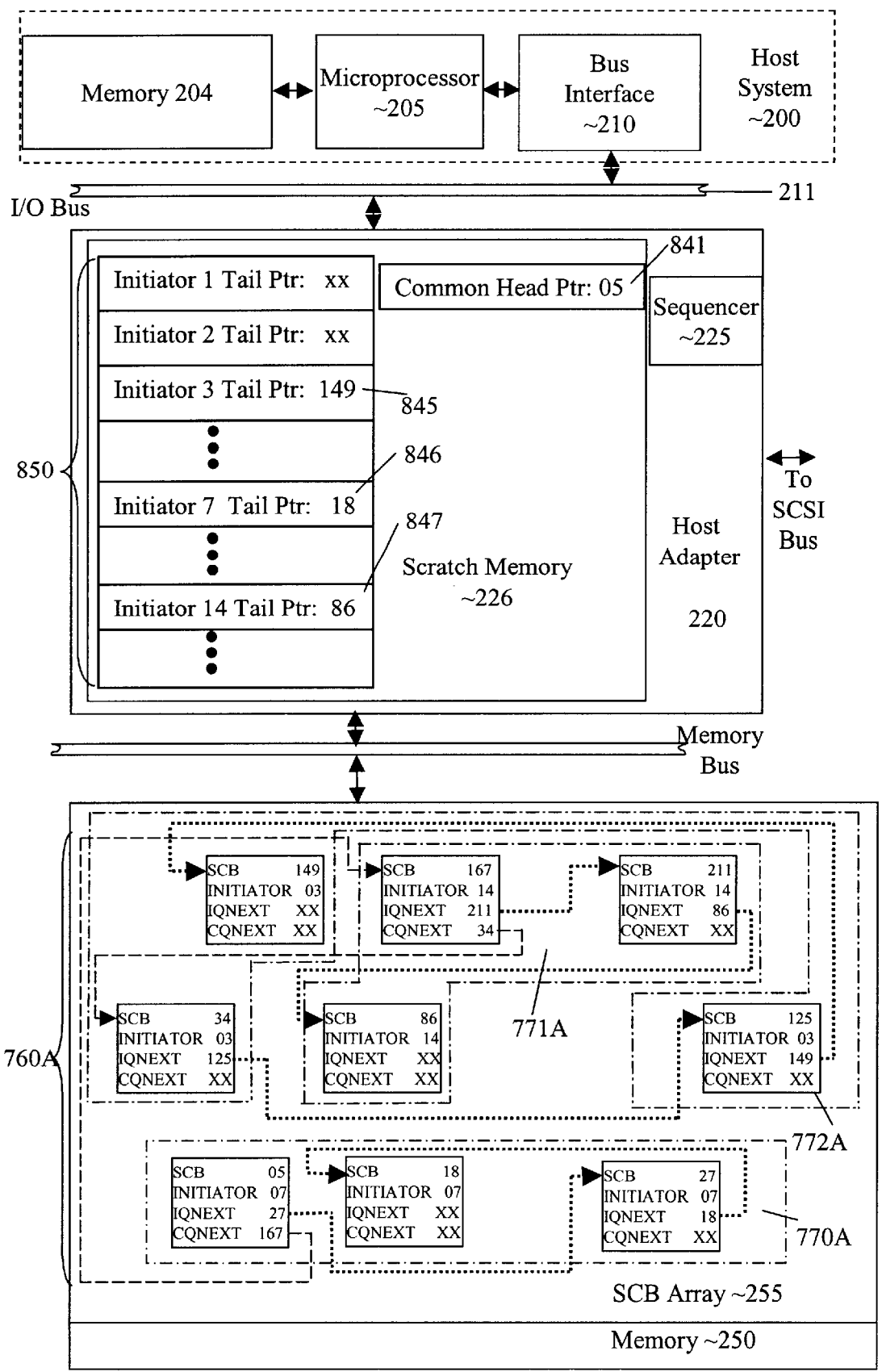
FIG. 9A is a block diagram of a host adapter system that includes another embodiment of the two-dimensional hardware initiator command block execution queue of this invention.
Figure 9B:
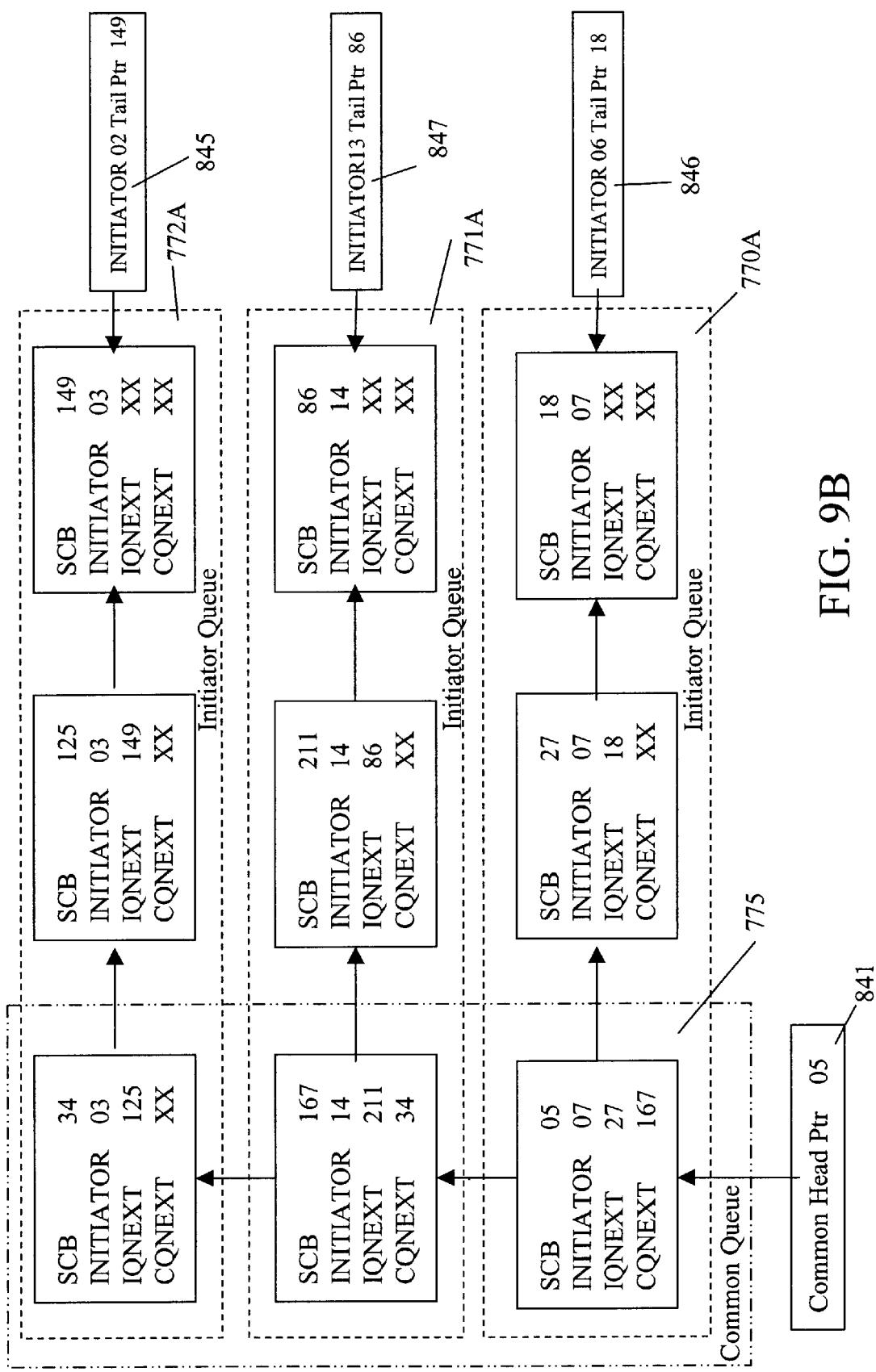
FIG. 9B is an illustration of only the two-dimensional initiator hardware command block execution queue of FIG. 9A.

In this embodiment, sequencer 225 uses method 1000 to append a new SCB to two-dimensional initiator execution queue 760A (FIG. 9B). Specifically, when there is a new SCB for an initiator device in SCB array 255, firmware implementing append operation 1000 (FIG. 10A) and executing on sequencer 225 reads the initiator number from the SCB in read initiator number operation 1001, and processing transfers to valid tail pointer check operation 1002.

In operation 1002, the initiator number is used as index into list 850 of initiator queue tail pointers (FIG. 9A). If the initiator queue tail pointer at the indexed location in list 850 has an invalid value, processing transfers to walk common queue operation 1005 and otherwise to update SCB operation 1003.

If a valid initiator tail pointer exists for an initiator device, there is an initiator queue for that initiator in SCB array 255. Consequently, update SCB operation 1003 accesses the SCB addressed by the initiator tail pointer for the initiator read in operation 1001. Update SCB operation 1003 writes the location of the new SCB within SCB array 255 in field IQNEXT of the SCB addressed by the initiator tail pointer. Update SCB operation 1003 transfers processing to update initiator tail pointer operation 1004.

In update initiator tail pointer operation 1004, the initiator tail pointer in list 850 that is indexed by the initiator number in the new SCB is changed to point at the storage location in SCB array 255 of the new SCB. Operation 1004 transfers to done operation 1010, because the new SCB has been appended to the appropriate initiator queue and consequently two-dimensional initiator execution queue 760A.

If a valid initiator tail pointer does not exist for an initiator device in list 850, there is not an SCB for the initiator device in common queue 775. Consequently, walk common queue operation 1005 determines the tail SCB in common queue 775.

Figure 10A:
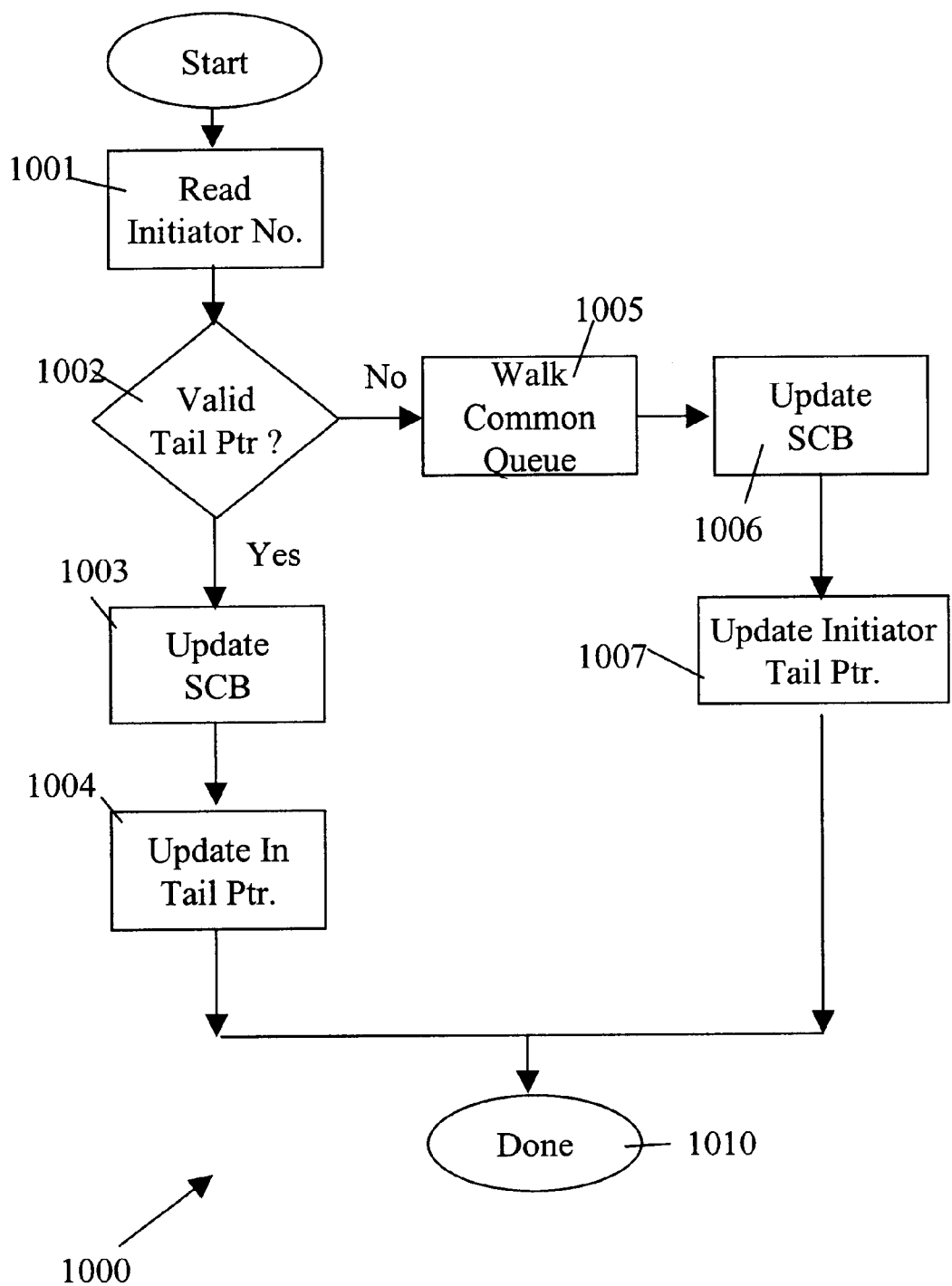
FIG. 10A is a process flow diagram of one embodiment of a method for appending hardware command blocks to the two-dimensional initiator hardware command block queue of FIGS. 9A and 9B.
Figure 10B:
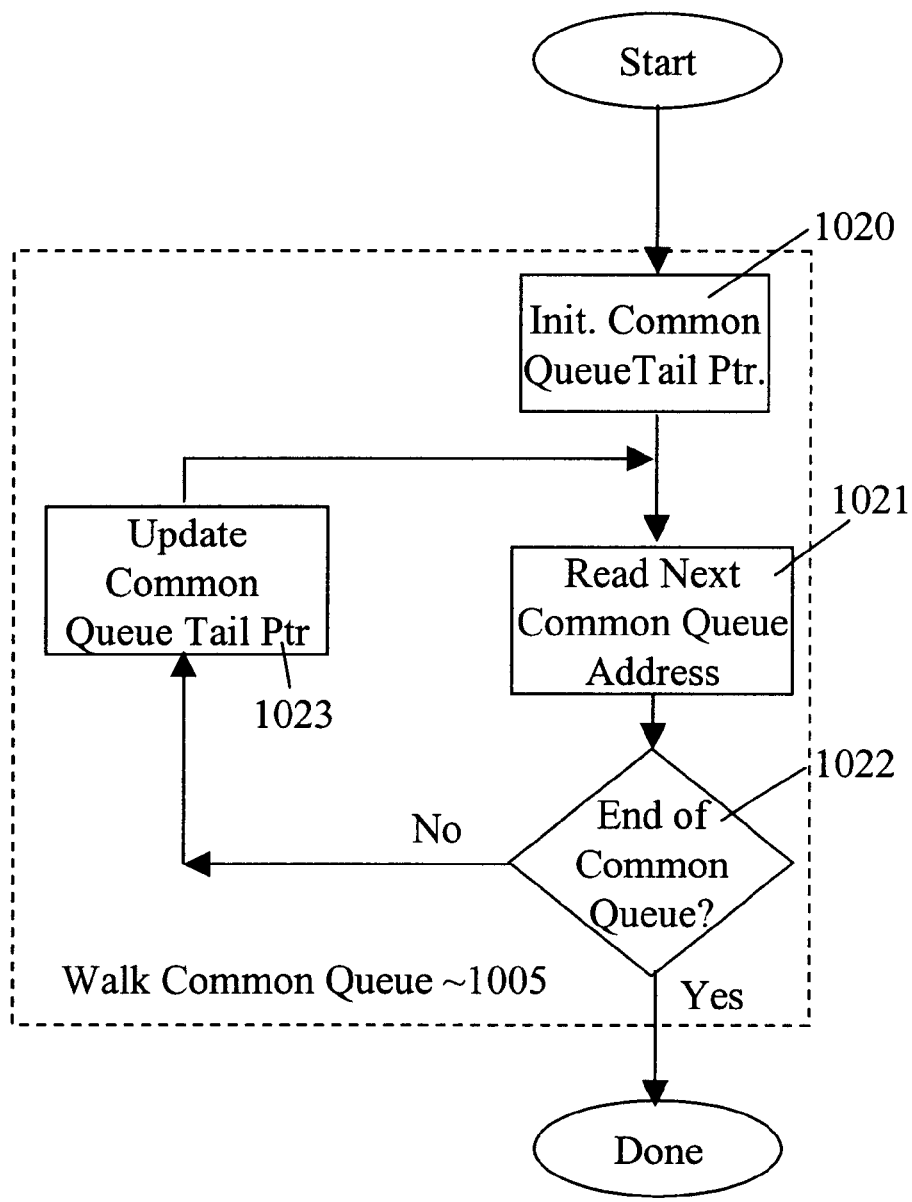
FIG. 10B is a process flow diagram for one embodiment of the walk common queue operation of FIG. 10A.

FIG. 10B is a process flow diagram for one embodiment of walk common queue operation 1005. In initialize common queue tail pointer operation 1020, the value, in common queue head pointer 841 is copied to a common queue tail pointer storage area, e.g., a temporary register. Hence, a common queue tail pointer is saved in temporary storage. Operation 1020 transfers processing to read next common queue address operation 1021

Read next common queue address operation 1021 reads the value in field CQNEXT of the SCB addressed by the common queue tail pointer. Operation 1021 transfers processing to end of queue check operation 1022.

End of queue check operation 1022 determines whether the SCB addressed by the common queue tail pointer is the last SCB in common queue 775. In this embodiment, check operation 1022 determines whether the value read from field CQNEXT is a valid value.

If the value is valid, there is another SCB in common queue 775 and so the end of queue has not been reached. In this case, processing transfers to update common queue tail pointer operation 1023. Conversely, if the value in field CQNEXT is invalid, the common queue tail pointer is addressing the tail SCB in common queue 775.

Update common queue tail pointer operations 1023 copies the value read from field CQNEXT to the common queue tail pointer storage location. Operation 1023 returns to read initiator operation 1021. Operations 1021, 1022, and 1023 are repeated, as appropriate, until check operation 1022 detects that the last SCB in common queue 775 has been reached. When the last SCB in common queue 775 is reached, processing transfers from operation 1005 to update SCB operation 1006 (FIG. 10A).

Update SCB operation 1006 accesses the SCB addressed by the common queue tail pointer. Update SCB operation 1006 writes the location of the new SCB within SCB array 255 in field CQNEXT of the SCB addressed by the common queue tail pointer. Update SCB operation 1006 transfers processing to update initiator tail pointer operation 1007.

In update initiator tail pointer operation 1007, the initiator tail pointer in list 850, which is indexed by the initiator number, is changed to point at the location in SCB array 255 of the new SCB. Operation 1007 transfers to done operation 1010, because the new SCB has been appended to end of common queue 775, and a new initiator queue has been defined in two-dimensional initiator execution queue 760A. Using method 1000, SCBs are appended to the common and initiator queues in the order of arrival from the initiator device(s).

Figure 11:
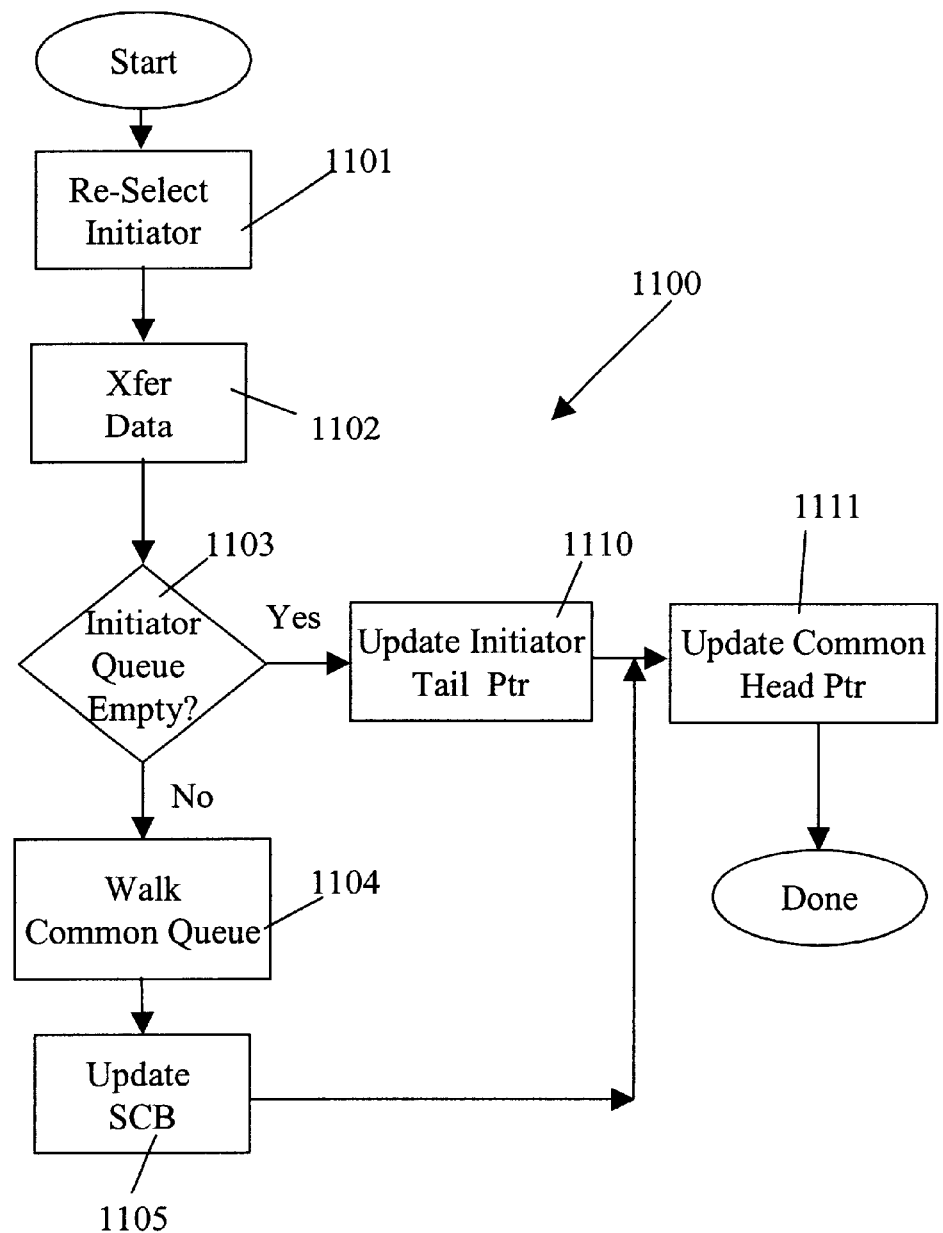
FIG. 11 is a process flow diagram of one embodiment of a method for managing removal of hardware command blocks from the two-dimensional initiator hardware command block queue of FIGS. 9A and 9B.

To transfer data specified in a SCB in two-dimensional initiator execution queue 760A to an initiator device, method 1100 (FIG. 11) is used. In re-select initiator operation 1101, host adapter 220 reads common queue head pointer 841, and then determines the initiator specified in the SCB at the head of two-dimensional initiator execution queue 760A, i.e., the SCB addressed by common queue head pointer 841. In the example of FIGS. 9A and 9B, common queue head pointer 841 addresses SCB 05, which specifies initiator 07. Consequently, host adapter 220 re-selects initiator 07 and transfers processing to transfer data operation 1102.

In transfer data operation 1102, host adapter 220 attempts to transfer the data associated with all the SCBs in the initiator queue for the selected initiator. The particular procedure for transferring data with an initiator is dependent on the protocol used, and the procedure is known to those of skill in the art.

It is possible that the data associated within all the SCBs in the initiator queue cannot be transferred with the initiator device following re-selection of the initiator device. Upon completion, transfer data operation 1102 transfers processing to initiator queue empty check operation 1103.

In initiator queue empty check operation 1103, host adapter 220 determines whether data for all the SCBs in the initiator queue were transferred to the selected initiator device, i.e., whether all the SCBs in the initiator queue were completed. In the embodiment of FIGS. 9A and 9B, field IQNEXT is read in the last SCB completed. If field IQNEXT in the last SCB for which data was transferred contains a valid pointer, SCBs remain in the initiator queue. Hence, the initiator queue in two-dimensional initiator execution queue 760A is not empty. Conversely, if field IQNEXT contains an invalid pointer, all SCBs in the initiator queue were completed, and the initiator queue in two-dimensional initiator execution queue 760A is empty.

The particular way used to determine whether the initiator queue is empty, e.g., whether all SCBs in the initiator queue were completed, is not essential to this invention. Multiple ways to make this determination are possible. For example, a count of the SCBs completed and a count of the SCBs in the initiator queue could be compared. Alternatively, a last SCB transferred pointer could be compared with the initiator tail pointer for the initiator queue. The important aspect is to determine whether upon completion of the transfer, SCBs remain in the initiator queue.

If the initiator queue is not empty, processing transfers from initiator queue empty check operation 1103 to walk common queue operation 1104. In walk common queue operation 1104, host adapter 220 determines the last SCB in common queue 775 in a manner equivalent to that described for operation 1005. With respect to method 1100 and in general, reference to host adapter 220 taking an action refers to the action that results from firmware executing on sequencer 225. In the example of FIGS. 9A and 9B, SCB 34 is at the end of common queue 775. Operation 1104 transfers to update SCB operation 1105.

In update SCB operation 1105, field CQNEXT in the SCB at the end of common queue 775 is set to the value of the location in SCB array 255 of the first SCB remaining in initiator queue 770A. As an example, assume that only SCB 05 in initiator queue 770A was successfully completed. In this case, the first SCB remaining in initiator queue 770A is SCB 27. (See FIG. 9B.) Thus, update SCB operation 1105 writes 27 to field CQNEXT in SCB 34 that is at the end of common queue 775. Update SCB operation 1105 transfers processing to update common queue head pointer operation 1111.

In update common queue head pointer operation 1111, common queue head pointer 841 is changed to address the next SCB in common queue 775. In FIG. 9B, operation 1111 reads field CQNEXT in SCB 05 and writes that value to common queue head pointer 841 so that common queue head pointer 841 addresses SCB 167 for initiator 14. (See FIG. 9C.)

The above discussion assumed that upon completion of transfer data operation 1102, the initiator queue for the re-selected initiator was not empty and so check operation 1103 transferred to operation 1104. However, if the initiator queue were empty, check operation 1103 transfers processing to update initiator tail pointer operation 1110.

In update initiator tail pointer operation 1110, the initiator tail pointer for the re-selected initiator in list 850 is set to an invalid value to indicate that there is no initiator queue for that initiator in two-dimensional initiator execution queue 760A. Again, for FIGS. 9A and 9B, initiator tail pointer 746 is set to an invalid value in list 850 in operation 1110. This operation effectively removes the SCBs for initiator 07 from two-dimensional initiator execution queue 760A. Operation 1110 also transfers to operation 1111 that was described above and that description is incorporated herein by reference.

Figure 12A:
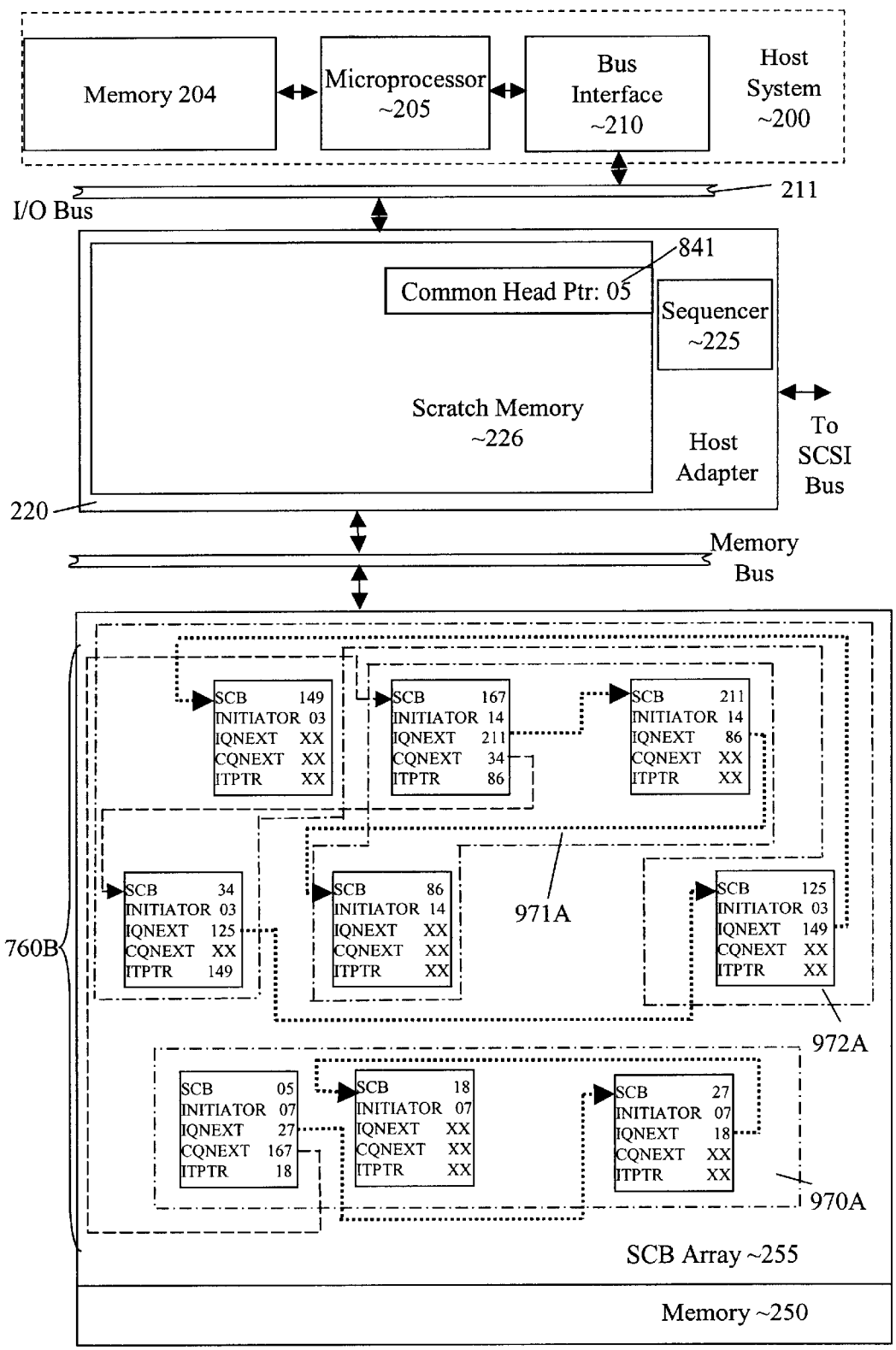
FIG. 12A is a block diagram of a host adapter system that includes still another embodiment of the two-dimensional hardware initiator command block execution queue of this invention.

In the embodiment of FIG. 9A, the storage requirement for the common queue tail pointer was eliminated. In yet another embodiment, the requirement for storage space in scratch memory 226 to support two-dimensional initiator execution queue 760 is reduced further by eliminating both table 850 and common queue tail pointer 842 as illustrated in FIG. 12A.

However, the number of SCBs in an initiator queue may be rather long and so a tail pointer for an initiator queue eliminates the need to walk that queue to identify the tail SCB at the end of the queue. Thus, in this embodiment, a tail pointer for each initiator queue is retained, but is not stored in scratch memory 226.

In one embodiment, a tail pointer for an initiator queue is stored in the SCB in the common queue for that initiator queue, i.e., a tail pointer for each initiator queue is stored in the head SCB for that initiator queue. The head SCB for an initiator queue is the SCB that is included in the common initiator queue.

This embodiment provides an initiator two-dimensional execution queue with very little scratch memory overhead. A two-byte common queue head pointer 841 is still required, but common queue tail pointer 842 (FIG. 8) and initiator tail pointer table 850 (FIG. 8) are eliminated from scratch memory 226.

Field ITPTR that is used to store the initiator queue tail pointer in the head SCB, in one embodiment, does not require allocation of a new field in each SCB. For example, each new SCB that is transferred from host system 200 includes a field specifying the address of a next SCB in an endless new SCB queue in host system 200. After the new SCB has been received by host adapter 220 and the address for the next SCB in the endless new SCB queue in host system 200 has been saved, this field can be re-allocated as field ITPTR. Thus, the same SCB that is used for other embodiments of the host adapter two-dimensional execution queue can be used in this embodiment.

Figure 12B:
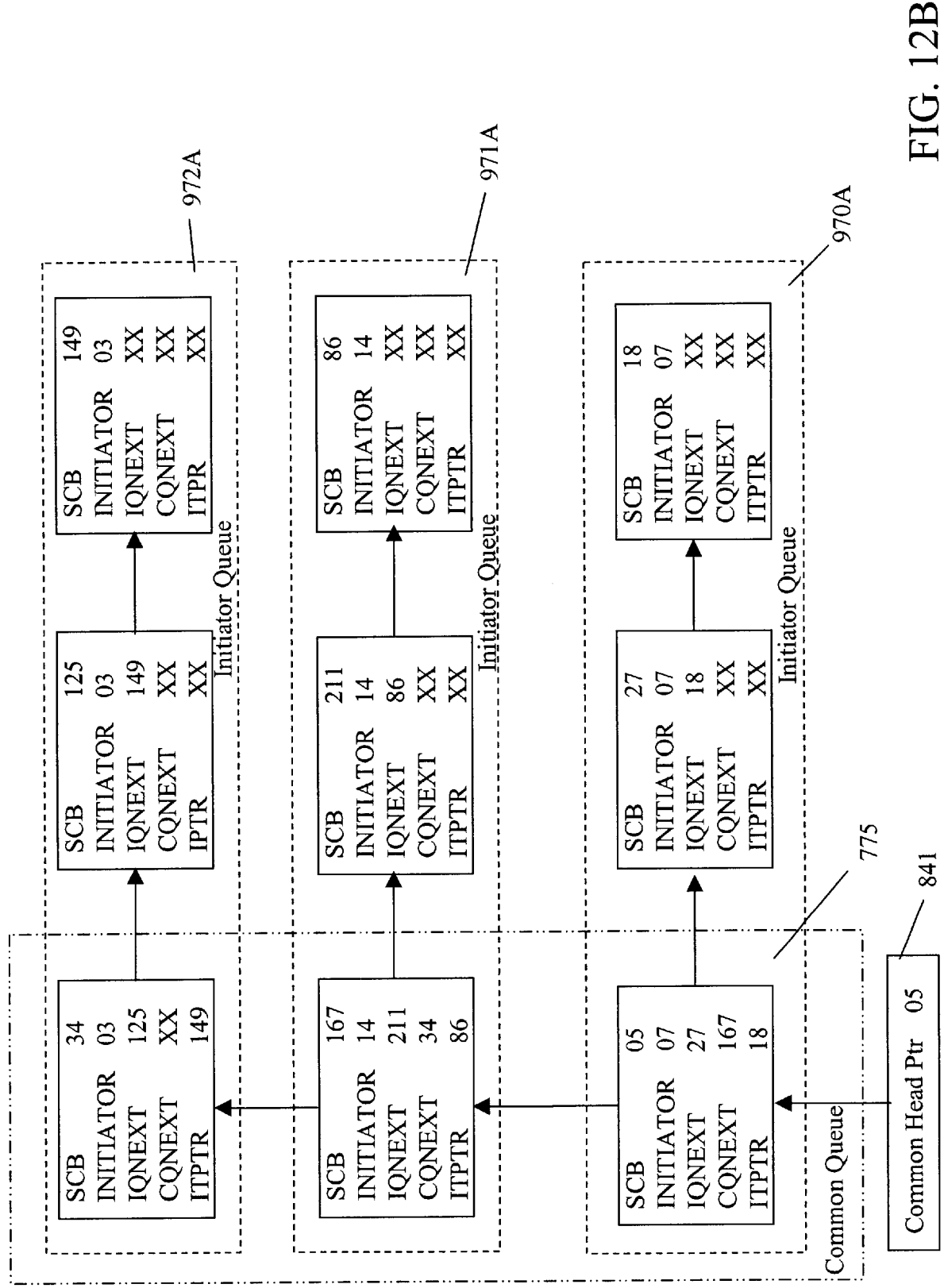
FIG. 12B is an illustration of only the two-dimensional initiator hardware command block execution queue of FIG. 12A.

In FIG. 12A, two-dimensional initiator execution queue 760B is similar to two-dimensional initiator execution queue 760A. Two-dimensional initiator execution queue 760B includes a plurality of initiator queues 970A, 971A, and 972A (FIGS. 12A and 12B). In this embodiment, each SCB in common queue 775 has a field ITPTR that contains a pointer to the tail SCB at the end of the initiator queue. If the head SCB is the only SCB in the initiator queue, field ITPTR is set to an illegal value in one embodiment, and to the storage location of the head SCB in SCB array 255 in another embodiment.

Figure 13:
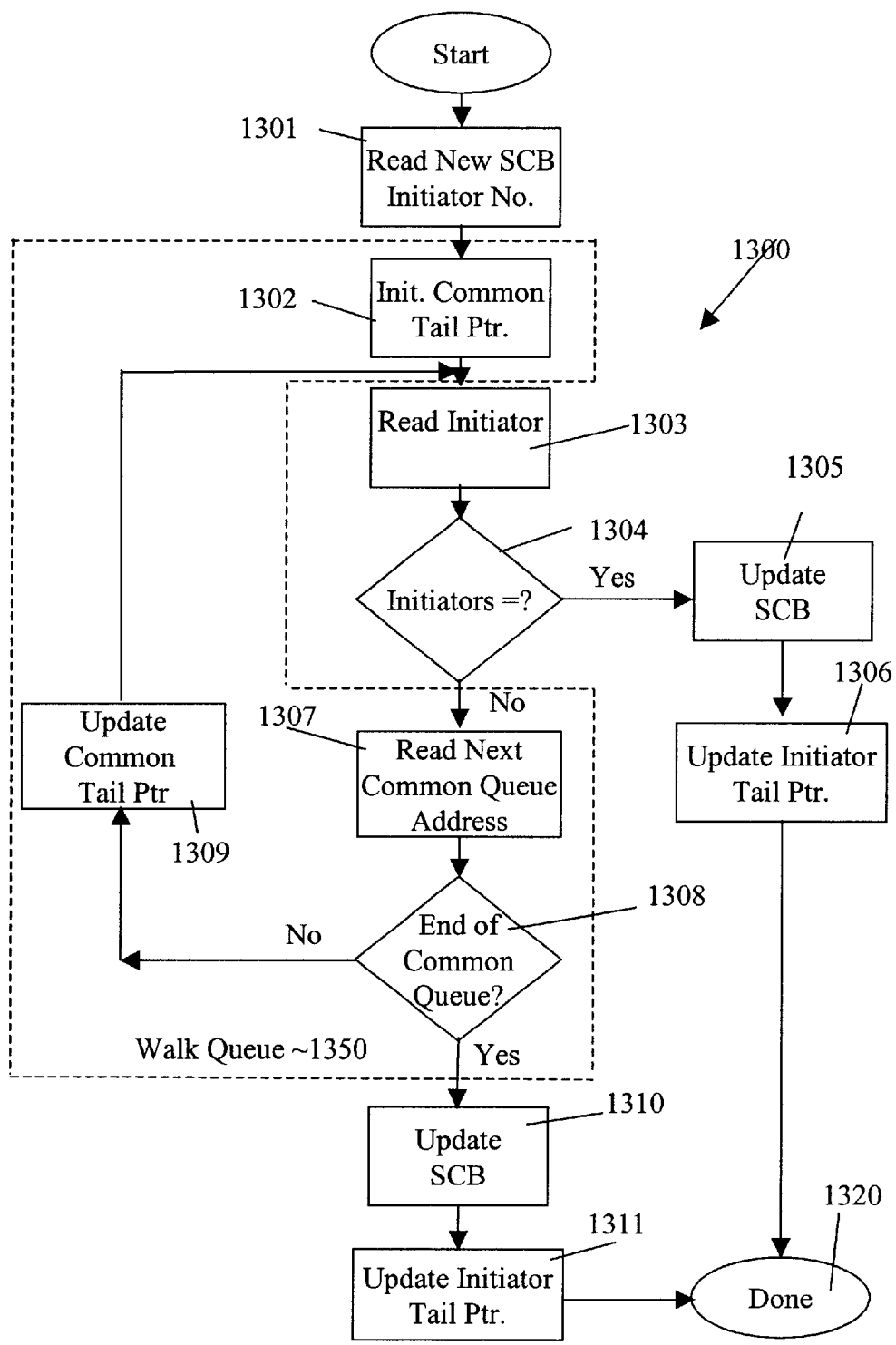
FIG. 13 is a process flow diagram of one embodiment of a method for appending hardware command blocks to the two-dimensional initiator hardware command block queue of FIGS. 12A and 12B.

In this embodiment of two-dimensional initiator execution queue 760B, sequencer 225 uses method 1300 to append a new SCB to two-dimensional initiator execution queue 760B (FIG. 12B). Specifically, when there is a new SCB in SCB array 255 for a command received from an initiator device, firmware implementing append operation 1300 (FIG. 13) and executing on sequencer 225 reads the initiator number from the SCB in read new SCB initiator number operation 1301, and processing transfers to initialize common queue tail pointer operation 1302.

In operation 1302, the value in common queue head pointer 841 is copied to a common queue tail pointer storage area, e.g., a temporary register. Hence, a common queue tail pointer is saved in temporary storage. Operation 1302 transfers processing to read initiator operation 1303.

In read initiator operation 1303, the initiator for the SCB addressed by the common queue tail pointer is read. Operation 1303 transfers processing to initiators equal check operation 1304.

Initiators equal check operation 1304 compares the initiator for the new SCB read in operation 1301 with the initiator read in operation 1303. If the two initiators are the same, a queue for the initiator exists and the new SCB is appended to the end of the initiator queue, as described more completely below, by operations 1305 and 1306. If the two initiators are not the same, check operation 1304 transfers to read next common queue address operation 1307 in a walk queue operation 1350.

Read next common queue address operation 1307 reads the value in field CQNEXT of the SCB addressed by the common queue tail pointer. Operation 1307 transfers processing to end of queue check operation 1308.

End of queue check operation 1308 determines whether the SCB addressed by the common queue tail pointer is the last SCB in common queue 775. In this embodiment, check operation 1308 determines whether the value read from field CQNEXT is a valid value.

If the value is valid, there is another SCB in common queue 775 and so end of the queue has not been reached. In this case, processing transfers to update common queue tail pointer operation 1309. Conversely, if the value in field CQNEXT is invalid, the common queue tail pointer is addressing the tail SCB in common queue 775 and so the new SCB must be appended to common queue 775 by operations 1310 and 1311.

Update common queue tail pointer operation 1309 copies the value read from field CQNEXT to the common queue tail pointer storage location. Operation 1309 returns to read initiator operation 1303.

Operations 1303, 1304, 1307, 1308, and 1309 are repeated as appropriate until either a match is detected by check operation 1304, or check operation 1308 detects that the last SCB in common queue 775 has been reached without finding an initiator match. When an initiator match is found, as indicated above, check operation 1304 transfer to update SCB operation 1305.

Update SCB operation 1305 writes the location of the new SCB within SCB array 255 in field IQNEXT of the SCB addressed by the value in field ITPTR of the SCB address by the temporarily stored common queue tail pointer, i.e., the tail SCB in the initiator queue that is addressed by the initiator tail pointer for that initiator. Update SCB operation 1305 transfers processing to update initiator tail pointer operation 1306.

In update initiator tail pointer operation 1306, the storage location of the new SCB in SCB array 255 is written to field ITPTR in the SCB addressed by the temporarily stored common queue tail pointer. Thus, the initiator tail pointer for that initiator queue is updated. Operation 1306 transfers to done operation 1320, because the new SCB has been appended to the appropriate initiator queue and consequently two-dimensional initiator execution queue 760B.

If the end of the common queue is reached, check operation 1308 transfers processing to update SCB operation 1310. Update SCB operation 1310 accesses the SCB addressed by the temporarily stored common queue tail pointer. Update SCB operation 1310 writes the location of the new SCB within SCB array 255 in field CQNEXT of the SCB addressed by the common queue tail pointer. Update SCB operation 1310 transfers processing to update initiator tail pointer operation 1311.

In update initiator tail pointer operation 1311, the storage location of the new SCB in SCB array 255 is copied to field ITPTR as the initiator tail pointer. Operation 1311 transfers to done operation 1320, because the new SCB has been appended to end of common queue 775, and a new initiator queue has been established in two-dimensional initiator execution queue 760B. Using method 1300, SCBs are appended to the common and initiator queues in the order of arrival from the initiator device(s).

Figure 14:
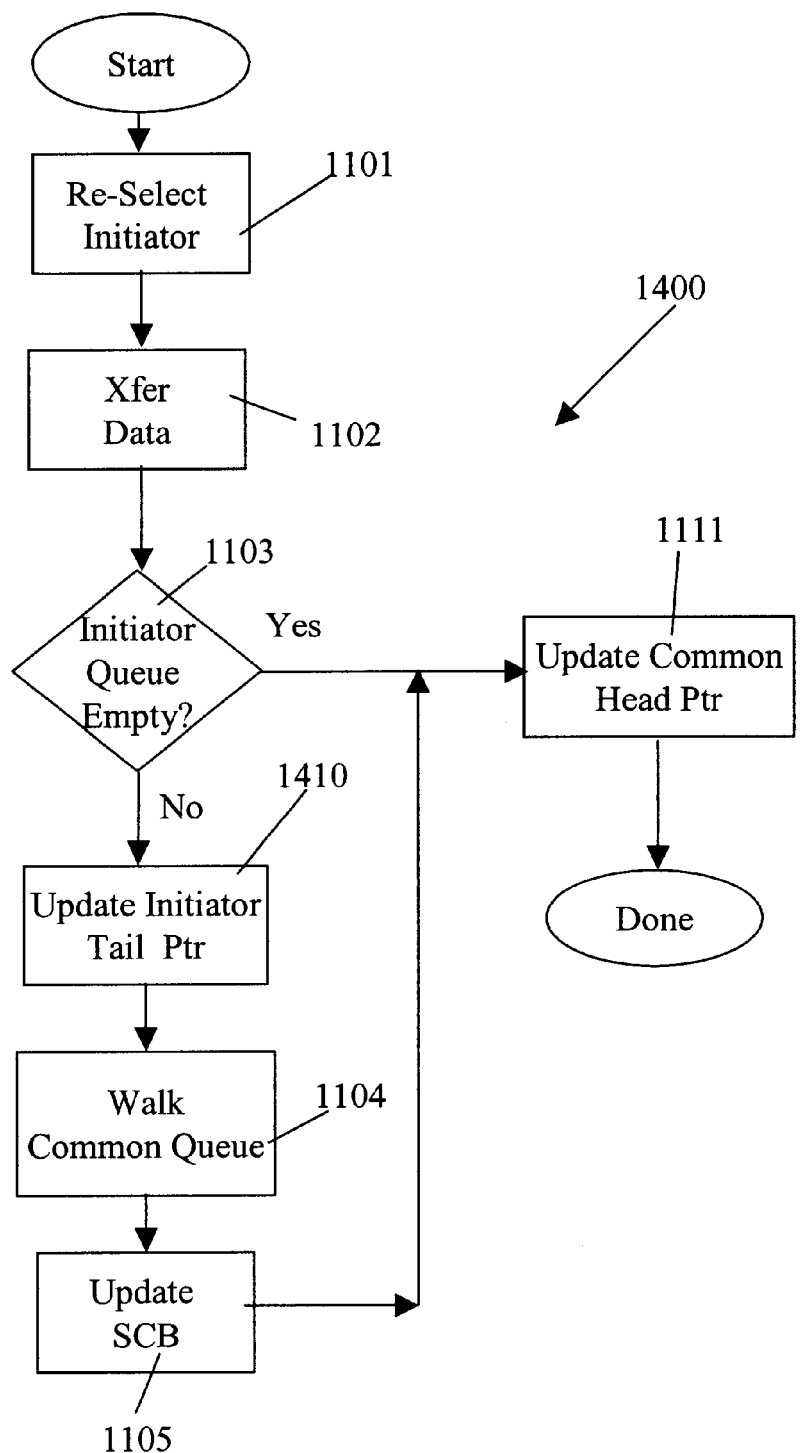
FIG. 14 is a process flow diagram of one embodiment of a method for managing removal of hardware command blocks from the two-dimensional initiator hardware command block queue of FIGS. 12A and 12B.

To transfer data specified in a SCB from two-dimensional initiator execution queue 760B to an initiator device, method 1400 (FIG. 14) is used. Operations 1101 to 1103 are the same as described above and that description is incorporated herein by reference.

In initiator queue empty check operation 1103, host adapter 220 determines whether data for all the SCBs in the initiator queue were transferred to the selected initiator device, i.e., whether all the SCBs in the imitator queue were completed. In the embodiment of FIGS. 12A and 12B, field IQNEXT is read in the last SCB completed. If field IQNEXT in the last SCB transferred contains a valid pointer, SCBs remain in the initiator queue to be transferred and the initiator queue in two-dimensional initiator execution queue 760A is not empty. Conversely, if field IQNEXT contains an invalid pointer, all SCBs in the initiator queue were completed, and the initiator queue in two-dimensional initiator execution queue 760B is empty.

Figure 12C:
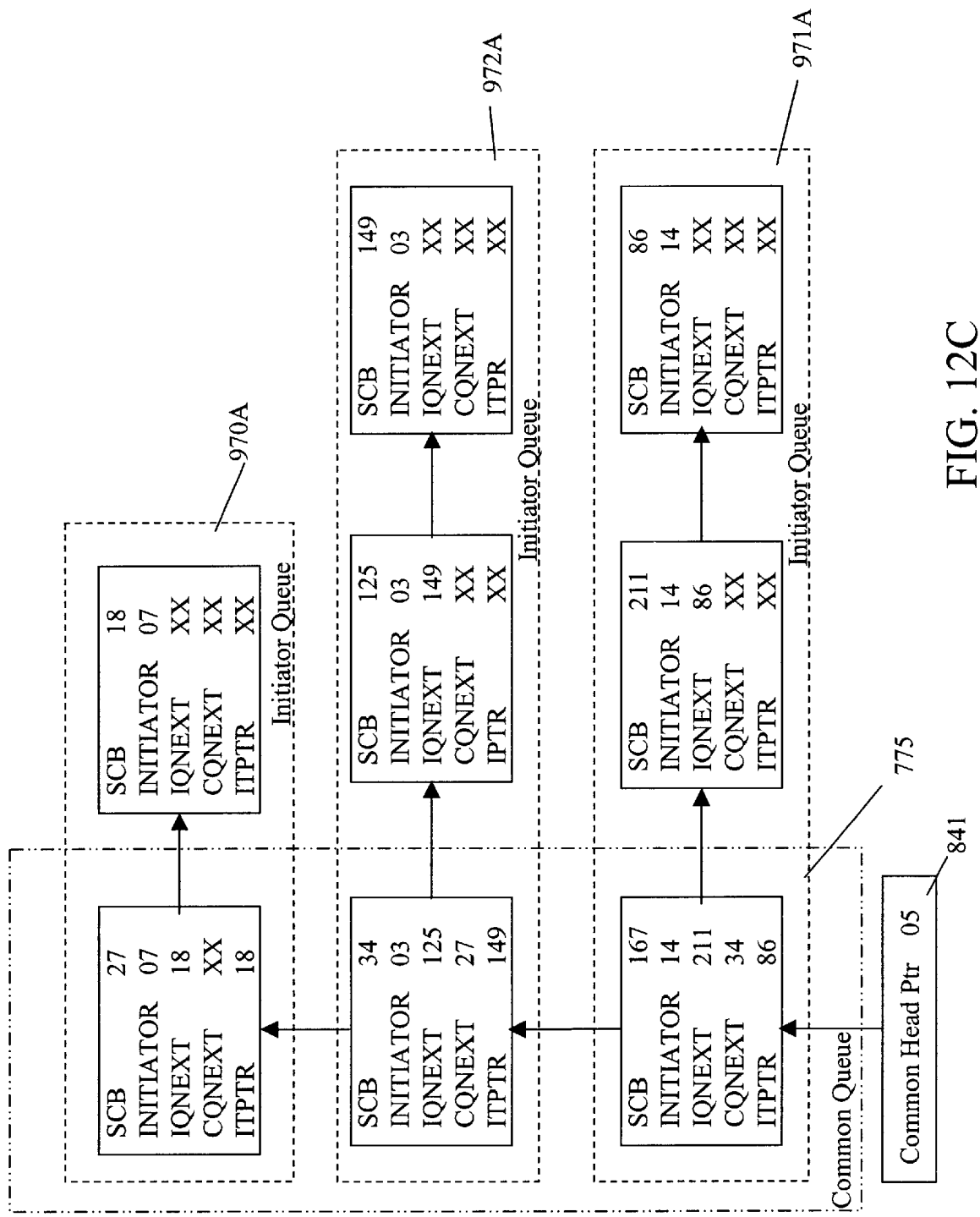
FIG. 12C is an illustration of the two-dimensional initiator hardware command block execution queue of FIG. 9B after sending data for the common queue head hardware command block to an initiator device.

If the initiator queue is not empty, processing transfers from initiator queue empty check operation 1103 to update initiator tail pointer operation 1410. In operation 1410, the initiator tail pointer is read from the SCB that was at the head of the initiator queue, i.e., the SCB addressed by common queue head pointer 841, and written to field ITPTR in the first SCB in the initiator queue that was not completed, i.e., field ITPTR is updated in the SCB that becomes a part of common queue 775. In the example of FIG. 12B, if only SCB 05 is completed, operation 1410 reads 18 from SCB 05 and writes 18 to field ITPTR of SCB 27 (See FIG. 12C). Operation 1410 transfers processing to walk common queue operation 1104.

In walk common queue operation 1104, host adapter 220 determines the last SCB in common queue 775 in a manner equivalent to that described for operation 1005. With respect to method 1400 and in general, reference to host adapter 220 taking an action refers to the action that results from firmware executing on sequencer 225. In the example of FIGS. 12A and 12B, SCB 34 that is at the end of common queue 775. Operation 1104 transfers to update SCB operation 1105.

Update SCB operation 1105 was described above and that description is incorporated wherein by reference. Update SCB operation 1105 transfers processing to update common queue head pointer operation 1111 and the above description of operation 1111 is also incorporated herein by reference.

The above discussion assumed that upon completion of transfer data operation 1102, the initiator queue for the re-selected initiator was not empty and so check operation 1103 transferred to operation 1410. However, if the initiator queue were empty, check operation 1103 transfers processing to operation 1111 that was described above and that description is incorporated herein by reference.

Hence, for this embodiment, the same two-dimensional execution queue is implemented for a host adapter in target mode. The two-dimensional execution queue has the same high performance characteristics as the two-dimensional execution queue for the host adapter in initiator mode. The only additional cost is an initiator common queue head pointer in scratch memory 226.

Various combinations of the two-dimensional execution queues and supporting pointers can be used in a host adapter that functions in both the initiator and target modes. For example, the two-dimensional execution queue structures of FIG. 3A could be used with the two-dimensional execution queue structures of FIG. 12A in a single host adapter.

Although particular embodiments of the present invention have been shown and described, it will be apparent to those skilled in the art that changes and modifications may be made without departing from the present invention in its broader aspects. Therefore, the embodiments described herein are illustrative only and are not intended to limit the invention to the specific embodiments described.

I claim:

1. In a memory, a command block execution queue comprising:

a plurality of command blocks in a first linked list; and another plurality of command blocks in a second linked list, where only one of said another plurality of command blocks is included in said plurality of command blocks in said first linked list, and said only one of said another plurality of command blocks comprises:

a tail pointer to a last command block in said another plurality of command blocks wherein said tail pointer is an only delimiter for said second linked list.

2. The command block execution queue as in claim 1 further comprising:
   a head pointer to a head command block in said first linked list wherein said head pointer is an only delimiter for said first linked list stored in said memory.

3. A command block execution queue comprising:
   a common linked list of command blocks having a common head command block and a common tail command block;
   a head pointer to said common head command block;
   an initiator linked list of command blocks having an initiator head command block and an initiator tail command block wherein only said initiator head command block is included in said common linked list of command blocks; and said initiator head command block comprises a tail pointer to said initiator tail command block.

4. The command block execution queue of claim 3 wherein said common linked list contains a maximum of one command block for an initiator.

5. The command block execution queue of claim 4 wherein said initiator linked list contains only command blocks for a single initiator device.

6. The command block execution queue of claim 3 further comprising:
   another initiator linked list of command blocks having another initiator head command block and another initiator tail command block wherein only said another initiator head command block is included in said common linked list of command blocks and said another initiator command block comprises a tail pointer to said another initiator tail command block.

7. A method of managing a command block execution queue where each command block is associated with one of a plurality of initiator devices, the method comprising:
   determining whether an initiator queue exists for an initiator device specified in a hardware command block;
   appending said hardware command block to a tail of the initiator queue for said initiator device upon said determining finding that the initiator queue exists; and
   appending said hardware command block to a tail of a common queue upon said determining finding that the initiator queue does not exist.

8. The method of claim 7 wherein said appending said hardware command block to said tail of said common queue further comprises:
   walking said common queue to locate said tail.

9. A method of managing command block execution queue where each command block is associated with one of a plurality of initiator devices, the method comprising:
   appending a new command block to a common tail command block of a common linked list of command blocks when said new command block is associated with an initiator device different from initiator devices associated with command blocks included in said common linked list of command blocks; and
   appending said new command block to an initiator tail command block of an initiator linked list of command blocks when said new command block is associated with an initiator device which is a same initiator device as that associated with one of the command blocks included in said common linked list of command blocks wherein only one initiator command block of said initiator linked list is included in said common linked list of command blocks.

10. A system comprising:
    a two-dimensional initiator execution queue comprising:
      plurality of initiator command blocks in a first linked list; and
      another plurality of initiator command blocks in a second linked list, where only one of said another plurality of initiator command blocks is included in said plurality of initiator command blocks in said first linked list, and said only one of said another plurality of initiator command blocks comprises:
        a tail pointer to a last command block in said another plurality of command blocks wherein said tail pointer is an only delimiter for said second linked list.
    a memory coupled to said two-dimensional initiator execution queue, said memory comprising: a stored common queue head pointer for said two-dimensional initiator execution queue.

11. The system of claim 10 further comprising:
    a two-dimensional target execution queue comprising:
      a plurality of target command blocks in a third linked list; and
      another plurality of target command blocks in a fourth linked list, where only one of said another plurality of target command blocks is included in said plurality of target command blocks in said third linked list.

* * * * *